United States Patent
Li et al.

(10) Patent No.: US 11,034,212 B2
(45) Date of Patent: Jun. 15, 2021

(54) SYSTEMS AND METHODS FOR CABIN AIR QUALITY CONTROL

(71) Applicant: GM GLOBAL TECHNOLOGY OPERATIONS LLC, Detroit, MI (US)

(72) Inventors: Yan Li, Shanghai (CN); Wenshui Wang, Shanghai (CN); Xiaolin Zhu, Shanghai (CN); Jing Zhang, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 138 days.

(21) Appl. No.: 16/069,374

(22) PCT Filed: Mar. 1, 2016

(86) PCT No.: PCT/CN2016/075142
§ 371 (c)(1),
(2) Date: Jul. 11, 2018

(87) PCT Pub. No.: WO2017/147777
PCT Pub. Date: Sep. 8, 2017

(65) Prior Publication Data
US 2019/0023099 A1    Jan. 24, 2019

(51) Int. Cl.
*B60H 1/00* (2006.01)
*B60H 1/24* (2006.01)
*B60H 3/06* (2006.01)

(52) U.S. Cl.
CPC ......... *B60H 1/008* (2013.01); *B60H 1/00842* (2013.01); *B60H 1/00978* (2013.01);
(Continued)

(58) Field of Classification Search
CPC ........ B60H 2003/0683; B60H 1/00842; B60H 1/00985; B60H 1/242; B60H 1/008;
(Continued)

(56) References Cited

U.S. PATENT DOCUMENTS 6,758,739 B1    7/2004    Sangwan et al.
9,354,231 B1 *  5/2016    Glover ............... B01D 46/0086
(Continued)

FOREIGN PATENT DOCUMENTS

CN    101601951 A    12/2009
CN    204870438 U    12/2015
(Continued)

OTHER PUBLICATIONS

SIPO, International Search Report and Written Opinion thereof issued in International Application No. PCT/CN2016/075142, dated Oct. 17, 2016.

*Primary Examiner* — Steven S Anderson, II
(74) *Attorney, Agent, or Firm* — Lorenz & Kopf, LLP

(57) ABSTRACT

Methods and apparatus are provided for controlling an air quality within a passenger cabin. The method includes outputting one or more control signals, by a processor, to activate a motor to generate an airflow stream for observation by a fine particulate matter sensor, the fine particulate matter sensor generating sensor signals based on the observation; determining a concentration level of fine particulate matter in the airflow based on the sensor signals; and outputting one or more control signals to an air quality system associated with the passenger cabin to generate an airflow into the passenger cabin based on the determined concentration level, the airflow into the passenger cabin flowing through a fine particulate matter filter.

19 Claims, 12 Drawing Sheets

(52) U.S. Cl.
CPC ......... *B60H 1/00985* (2013.01); *B60H 1/242* (2013.01); *B60H 1/248* (2013.01); *B60H 3/06* (2013.01); *B60H 2003/0683* (2013.01)

(58) Field of Classification Search
CPC ...... B60H 1/248; B60H 1/00978; B60H 3/06; B60H 3/0085; B60H 3/0078; B60H 1/00821
See application file for complete search history.

(56) References Cited

U.S. PATENT DOCUMENTS

| | | | |
|---|---|---|---|
| 2009/0312905 A1* | 12/2009 | Marra | B60H 3/0608 701/36 |
| 2010/0144261 A1 | 6/2010 | Barkic et al. | |
| 2012/0159929 A1* | 6/2012 | Snopko | F01N 9/002 60/274 |
| 2015/0360544 A1* | 12/2015 | Fruehsorger | B60H 1/00821 96/19 |
| 2016/0146769 A1* | 5/2016 | Zhang | G01N 33/0073 73/31.02 |
| 2016/0280160 A1 | 9/2016 | MacNeille et al. | |
| 2016/0318368 A1 | 11/2016 | Alger et al. | |
| 2018/0353891 A1* | 12/2018 | Cho | B01D 46/0068 |

FOREIGN PATENT DOCUMENTS

| | | |
|---|---|---|
| DE | 602004013065 T2 | 6/2009 |
| WO | 2011145781 A1 | 11/2011 |

* cited by examiner

SYSTEMS AND METHODS FOR CABIN AIR QUALITY CONTROL

CROSS-REFERENCE TO RELATED APPLICATION

This application is a U.S. National-Stage entry under 35 U.S.C. § 371 based on International Application No. PCT/CN2016/075142, filed Mar. 1, 2016, which was published under PCT Article 21(2) and is hereby incorporated in its entirety by reference.

TECHNICAL FIELD

The present disclosure generally relates to vehicles, and more particularly relates to systems and methods for air quality control within a passenger cabin of a vehicle.

BACKGROUND

Air quality may vary across certain environments due to the characteristics of the environment. For example, air quality in a highly populated area may be different than air quality in a rural area. Further, air quality in an industrial area may be different than air quality in an agricultural area. In certain environments, levels of fine dust or particulate matter may be present in the air surrounding a vehicle, which may enter a passenger cabin of the vehicle and change a quality of the air within the passenger cabin. The levels of fine dust or particulate matter may vary depending upon the characteristics of the environment in which the vehicle is located. In many instances, users are unaware of the levels of fine dust in the passenger cabin due to the generally microscopic size of the fine dust particles.

Accordingly, it is desirable to provide an air quality control system in a passenger cabin of a vehicle, which determines a level of fine dust or particulate matter within the passenger cabin. It is also desirable to provide systems and methods for controlling an air quality within a passenger cabin, based on the determined level of fine dust. Furthermore, other desirable features and characteristics of the present invention will become apparent from the subsequent detailed description and the appended claims, taken in conjunction with the accompanying drawings and the foregoing technical field and background.

SUMMARY

In one embodiment, a method is provided for controlling an air quality within a passenger cabin. The method includes outputting one or more control signals, by a processor, to activate a motor to generate an airflow stream for observation by a fine particulate matter sensor, the fine particulate matter sensor generating sensor signals based on the observation; determining a concentration level of fine particulate matter in the airflow based on the sensor signals; and outputting one or more control signals to an air quality system associated with the passenger cabin to generate an airflow into the passenger cabin based on the determined concentration level, the airflow into the passenger cabin flowing through a fine particulate matter filter.

In one embodiment, an air quality control system for a passenger cabin is provided. The air quality control system includes a fine particulate matter sensor system. The fine particulate matter sensor system includes a motor, which is operable to drive a blower to create an airflow stream for observation by a fine particulate matter sensor, and the fine particulate matter sensor generates sensor signals based on the observation. The air quality control system includes an air quality system associated with the passenger cabin. The air quality system includes a fine particulate matter filter and a heating, ventilation and cooling system that is operable to generate an airflow through the fine particulate matter filter into the passenger cabin. The air quality control system also includes a control module that outputs one or more control signals to the motor of the fine particulate matter sensor system to drive the blower, receives and processes the sensor signals and determines a concentration level of fine particulate matter based on the processing, and outputs one or more control signals to the heating, ventilation and cooling system to generate the airflow based on the determined concentration level.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the air quality control system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
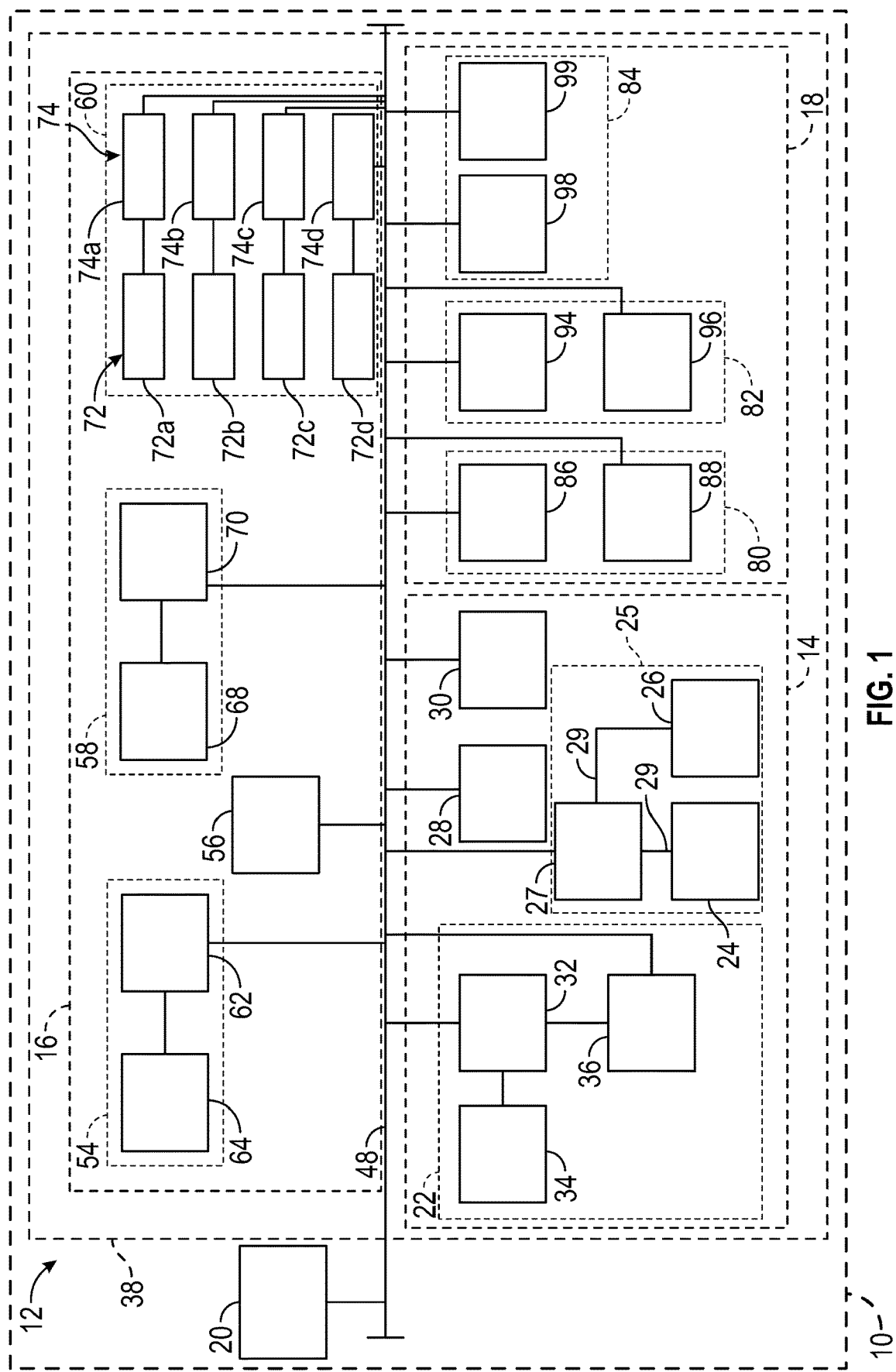
FIG. 1 is a functional block diagram of a vehicle having a passenger cabin that includes an air quality control system, in accordance with various embodiments.

With reference to FIG. 1, one example of a vehicle 10 having an air quality control system 12 is shown. The air quality control system 12 controls a quality of air within a cabin of the vehicle 10 based on sensor signals received from one or more sensors 14. In various embodiments, the air quality control system 12 includes the one or more sensors 14, an air quality system 16, at least one user interface 18 and a cabin air quality control module 20. One or more of the one or more sensors 14, the air quality system 16 and the at least one user interface 18 are disposed within a passenger cabin 38 of the vehicle 10, so as to be accessible by a passenger or occupant of the vehicle 10 and/or to observe one or more conditions within the passenger cabin 38. Although the figures shown herein depict an example with certain arrangements of elements, additional intervening elements, devices, features, or components may be present in an actual embodiment. It should also be understood that FIG. 1 is merely illustrative and may not be drawn to scale. It should be noted that the air quality control system 12 can be used with any suitable vehicle, such as an aircraft, ship, train, automobile, etc.

Figure 2:
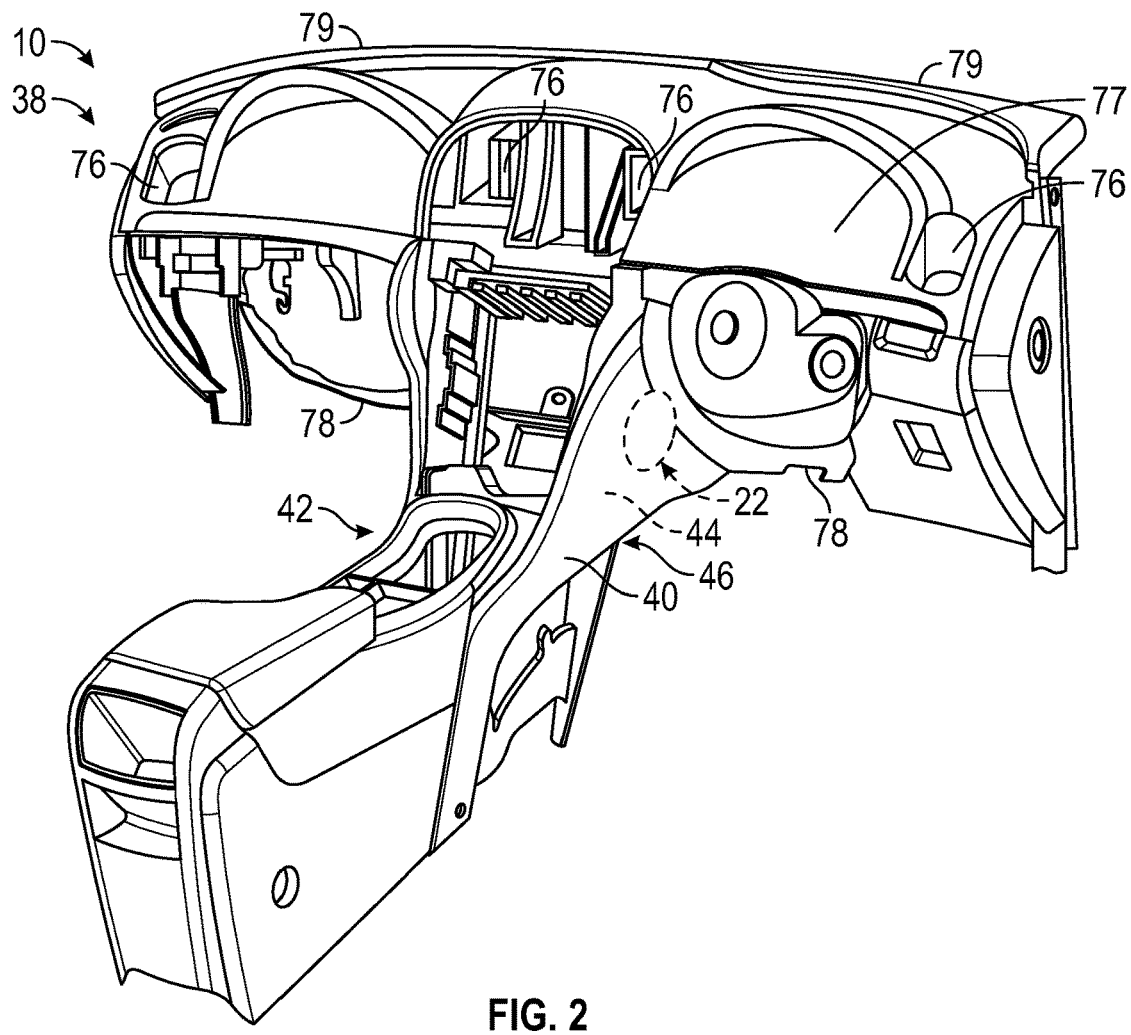
FIG. 2 is a schematic perspective view of a portion of the passenger cabin of the vehicle of FIG. 1, which illustrates an exemplary location for a fine dust sensor system in accordance with various embodiments.
Figure 3:
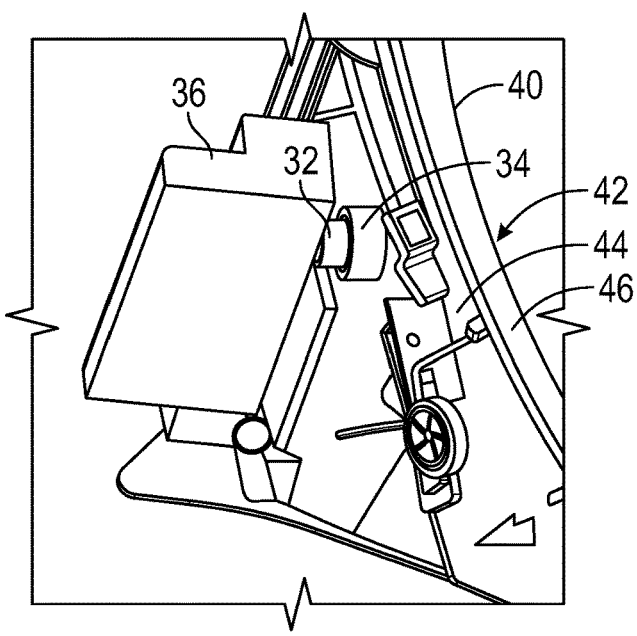
FIG. 3 is a schematic rear view of the fine dust sensor system of FIG. 2.

In various embodiments, the one or more sensors 14 comprise a fine dust sensor system 22 and a filter sensor system 25, which includes a first filter sensor 24, a second filter sensor 26 and a filter sensor monitor module 27. The one or more sensors 14 also include a first chemical sensor 28 and a second chemical sensor 30. The fine dust sensor system 22 includes a sensor motor 32, a fan or blower 34 and a fine dust sensor 36. With reference to FIG. 2, in one example, the fine dust sensor system 22 is coupled to a portion of the vehicle 10 within the passenger cabin 38 of the vehicle 10. For example, the fine dust sensor system 22 is coupled to a side panel 40 of a console 42. It should be noted that the fine dust sensor system 22 can be coupled to any desired location within the vehicle 10, and that the coupling of the fine dust sensor system 22 to the console 42 is merely exemplary. The fine dust sensor system 22 is coupled to the side panel 40 of the console 42 so as to be located within a cavity 44 defined by the console 42, as shown in FIG. 3. It should be noted that the sensor motor 32, the fan or blower 34 and the fine dust sensor 36 can be implemented as a fine dust sensor unit, which is received in the cavity 44. The cavity 44 is in fluid communication with the passenger cabin 38 via an opening 46 defined by the shape of the side panel 40.

With reference back to FIG. 1, the sensor motor 32 comprises a small electric motor, such as a DC motor or other type of motor, which is responsive to one or more control signals from the cabin air quality control module 20. The sensor motor 32 is in communication with the cabin air quality control module 20 over a communication architecture 48 that facilitates the transfer of power, data, commands, etc. The sensor motor 32 includes an output shaft (not shown), which is coupled to the blower 34. With reference to FIG. 3, the blower 34 is generally coupled to the sensor motor 32 and positioned within the cavity 44 such that the operation of the blower 34 draws air into the cavity 44 for observation by the fine dust sensor 36. In one example, the blower 34 is positioned adjacent to the side panel 40, and draws air into the cavity 44 to be observed by the fine dust sensor 36. The blower 34 generally comprises one or more blades coupled to a rotor, which rotates upon receipt of torque from the sensor motor 32 to direct or suck air into the cavity 44 via the opening 46. Thus, upon receipt of the one or more control signals from the cabin air quality control module 20, the sensor motor 32 drives the blower 34 via the output shaft (not shown) to draw air into the cavity 44 for observation by the fine dust sensor 36.

The fine dust sensor 36 observes air that flows through the cavity 44 via the opening 46 and generates sensor signals based thereon. In this example, the fine dust sensor 36 is an air quality sensor, which observes the air that flows through the cavity 44 and determines a quantity of fine dust or fine particulate matter contained within the airflow. For example, the fine dust sensor 36 can be a PM 2.5 sensor, which determines a concentration of fine particulate matter less than 2.5 micrometers in size that exist in the airflow (PM 2.5). In one example, the fine dust sensor 36 determines a concentration level of PM 2.5 in the airflow through the cavity 44 using a laser scattering theory. In certain embodiments, the fine dust sensor 36 determines a concentration level of PM 2.5 in the airflow through the cavity 44 using an infrared emitting diode (IRED) and a phototransistor. The sensor signals from the fine dust sensor 36 are communicated to the cabin air quality control module 20 over the communication architecture 48.

Figure 4:
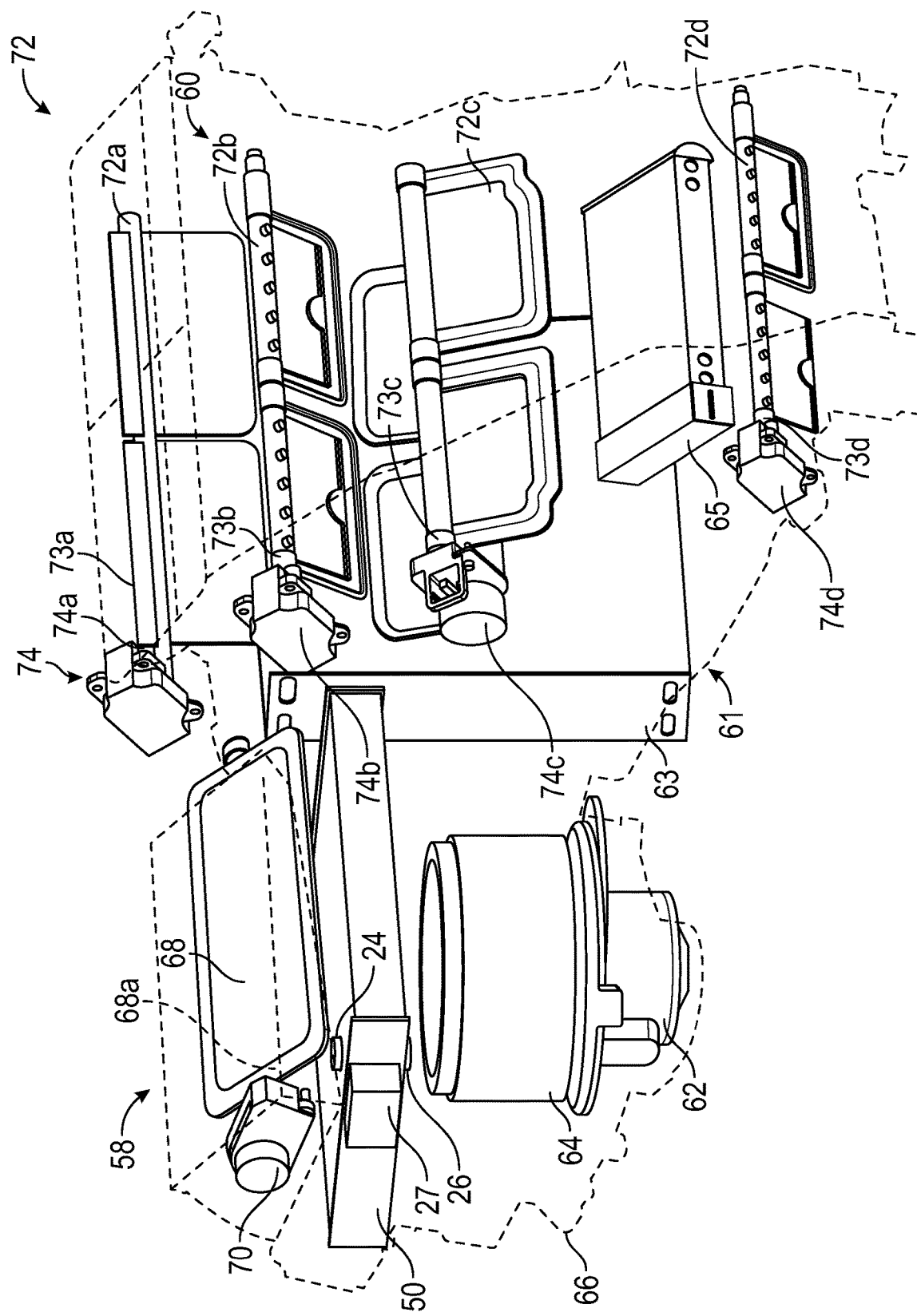
FIG. 4 is a schematic perspective view of a portion of an air quality system including a heating, ventilation and cooling (HVAC) system for the vehicle of FIG. 1 in accordance with various embodiments.

The filter sensor system 25 includes the first filter sensor 24 and the second filter sensor 26, which are each in communication with the filter sensor monitor module 27 over a communication architecture 29 that facilitates the transfer of power, data, commands, etc. The filter sensor monitor module 27 is in communication with the cabin air quality control module 20 over the communication architecture 48. With reference to FIG. 4, the first filter sensor 24 and the second filter sensor 26 are coupled a fine dust or a fine particulate matter filter 50. Generally, the fine particulate matter filter 50 comprises a PM 2.5 filter, which reduces an amount of PM 2.5 particles in the passenger cabin 38 (FIG. 2) of the vehicle 10. In one example, the first filter sensor 24 is coupled to a first side of the fine particulate matter filter 50. The second filter sensor 26 is coupled to a second, opposite side of the fine particulate matter filter 50, and is downstream from the first filter sensor 24 so as to be adjacent to a heating, ventilation and cooling (HVAC) blower 64 (FIG. 4). Each of the first filter sensor 24 and the second filter sensor 26 observe an airflow or air velocity through the fine particulate matter filter 50 and generate sensor signals based thereon, which are communicated to the filter sensor monitor module 27.

In one example, the first filter sensor 24 and the second filter sensor 26 comprise fine particulate matter filter air flow sensors, which observe and measure a flow rate of the air through the fine particulate matter filter 50, and generate sensor signals based thereon. The sensor signals generated by each of the first filter sensor 24 and the second filter sensor 26 are communicated to the filter sensor monitor module 27. The filter sensor monitor module 27 receives and processes the sensor signals, and determines an airflow through the fine particulate matter filter 50. Based on the determined airflow, the filter sensor monitor module 27 determines a status of the fine particulate matter filter 50, including, but not limited to, operating life left or replace. In one example, the filter sensor monitor module 27 receives the sensors signals from the first filter sensor 24 and the second filter sensor 26, and determines a difference between the sensor signals, which indicates an airflow through the fine particulate matter filter 50. Based on the determined airflow, the filter sensor monitor module 27 determines a status of the fine particulate matter filter 50 and communicates the determined status (e.g. operating life remaining, replace) to the cabin air quality control module 20 over the communication architecture 48.

With reference to FIG. 1, the first chemical sensor 28 comprises a carbon oxide sensor, which observes a concentration of carbon oxides within the air of the passenger cabin 38, including, but not limited to carbon monoxide, carbon dioxide, etc. Generally, the first chemical sensor 28 is coupled within the passenger cabin 38 to observe the air within the passenger cabin 38. The first chemical sensor 28 observes the air within the passenger cabin 38 and generates one or more sensor signals based on a concentration of carbon oxides. The sensor signals generated by the first chemical sensor 28 are communicated to the cabin air quality control module 20 over the communication architecture 48.

With reference to FIG. 1, the second chemical sensor 30 comprises a nitrogen oxide sensor, which observes a concentration of nitrogen oxides within the air of the passenger cabin 38, including, but not limited to nitric oxide, nitrogen dioxide, nitrous oxide, etc. Generally, the second chemical sensor 30 is coupled within the passenger cabin 38 to observe the air within the passenger cabin 38. The second chemical sensor 30 observes the air within the passenger cabin 38 and generates one or more sensor signals based on a concentration of nitrogen oxides. The sensor signals generated by the second chemical sensor 30 are communicated to the cabin air quality control module 20 over the communication architecture 48.

The air quality system 16 includes a heating, ventilation and cooling (HVAC) system 54, at least one ionizer 56, an air inlet system 58, and an outlet and temperature control system 60. The HVAC system 54 includes an evaporator and heater subassembly 61, a HVAC motor 62 and a HVAC blower 64. The evaporator and heater subassembly 61 is positioned downstream from the fine particulate matter filter 50 and the HVAC blower 64. The evaporator and heater subassembly 61 cools or heats the air as it passes through the evaporator and heater subassembly 61 prior to flowing through the fine particulate matter filter 50. In one example, the evaporator and heater subassembly 61 includes an evaporator 63 to cool the air from the HVAC blower 64 prior to the air entering the passenger cabin 38 and a heater 65 to warm the air from the HVAC blower 64 prior to the air entering the passenger cabin 38. As will be discussed, the air flows through one or both of the evaporator 63 and the heater 65 based on the outlet and temperature control system 60.

The HVAC motor 62 comprises an electric motor, which is responsive to one or more control signals received from the cabin air quality control module 20 to drive the HVAC blower 64. The HVAC motor 62 is in communication with the cabin air quality control module 20 over the communication architecture 48. The HVAC motor 62 includes an output shaft (not shown), which is coupled to the HVAC blower 64. With reference to FIG. 4, the HVAC blower 64 is generally in communication with the HVAC system 54, via a duct 66 for example, such that the operation of the HVAC blower 64 draws air into the HVAC system 54, through the fine particulate matter filter 50, into the duct 66, and the evaporator and heater subassembly 61 prior to entry into the passenger cabin 38. The HVAC blower 64 generally comprises one or more blades coupled to a rotor, which rotates upon receipt of torque from the HVAC motor 62 to draw or suck air through the fine particulate matter filter 50. The HVAC blower 64 draws air from the environment external to the vehicle 10 (fresh air) or draws air from within the passenger cabin 38 (recycled air) to create the airflow through the HVAC system 54 based on a position of an air inlet door 68 associated with the air inlet system 58. With reference to FIG. 1, upon receipt of the one or more control signals from the cabin air quality control module 20, the HVAC motor 62 drives the HVAC blower 64 via the output shaft (not shown) to generate a pressurized air flow through the fine particulate matter filter 50, the evaporator and heater subassembly 61 and the outlet and temperature control system 60. Stated another way, based on the receipt of the one or more control signals, the HVAC motor 62 drives the HVAC blower 64 to draw air in from the environment external to the vehicle or from within the passenger cabin, through the fine particulate matter filter 50, and into the evaporator and heater subassembly 61, prior to the airflow exiting into the passenger cabin 38 via the outlet and temperature control system 60.

Figure 4A:
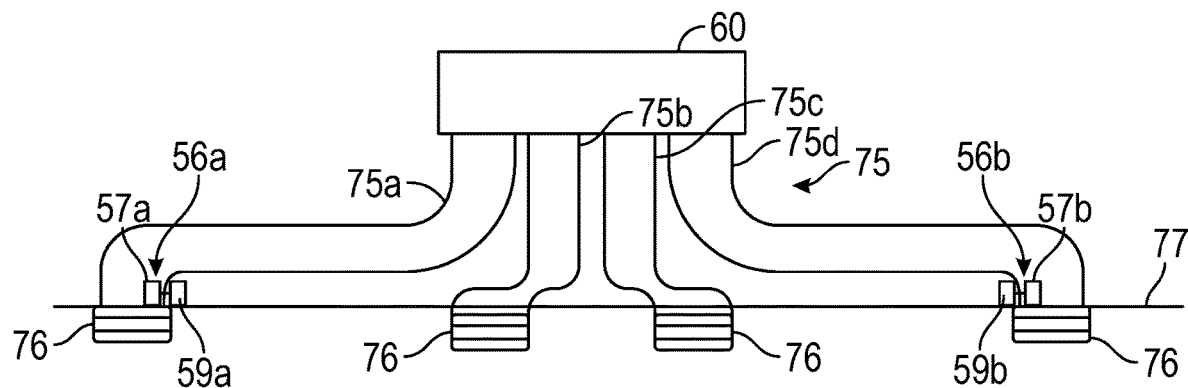
FIG. 4A is a schematic perspective view of a portion of the air quality system for the vehicle of FIG. 1 in accordance with various embodiments.

The at least one ionizer 56 is in communication with the cabin air quality control module 20 over the communication architecture 48. With reference to FIG. 4A, the at least one ionizer 56 comprises two ionizers 56a, 56b, which are each responsive to one or more control signals from the cabin air quality control module 20 to electrically charge the air particles flowing through the one or more ducts 75 (75a, 75b, 75c and/or 75d) to purify the airflow prior to the air entering the passenger cabin 38 via outlets 76. In on example, the ionizer 56a is illustrated herein as being coupled to the duct 75a so as to be at least partially disposed within the duct 75a, and positioned downstream from the outlet and temperature control system 60, downstream from the evaporator and heater subassembly 61 and downstream from the HVAC blower 64. The ionizer 56b is illustrated herein as being coupled to the duct 75d so as to be at least partially disposed within the duct 75d, and positioned downstream from the outlet and temperature control system 60, downstream from the evaporator and heater subassembly 61 and downstream from the HVAC blower 64. Generally, the ionizer 56a is coupled to the duct 75a such that an emission device 57a, comprising one or more needles, which ionize the airflow, extends into an interior of the duct 75a and an ionizer module 59a is substantially external to the duct 75a. The ionizer module 59a is in communication with the cabin air quality control module 20 to receive the one or more control signals, and is also in communication with the emission device 57a over a communication architecture that facilitates the transfer of data, power, etc. to activate or deactivate the emission device 57a. Generally, the ionizer 56b is coupled to the duct 75d such that an emission device 57b, comprising one or more needles, which ionize the airflow, extends into an interior of the duct 75d and an ionizer module 59b is substantially external to the duct 75d. The ionizer module 59b is in communication with the cabin air quality control module 20 to receive the one or more control signals, and is also in communication with the emission device 57b over a communication architecture that facilitates the transfer of data, power, etc. to activate or deactivate the emission device 57b. Moreover, while two ionizers 56a, 56b are shown, multiple ionizers 56 or a single ionizer 56 can be coupled to one or more of the ducts 75. In addition, the ionizers 56a and 56b can be coupled to the ducts 75 at any desired location. Further, the ionizers 56a, 56b can be coupled at any desired duct in fluid communication with the outlet and temperature control system 60.

The air inlet system 58 controls a type of airflow that enters the passenger cabin 38. In one example, the air inlet system 58 controls whether the air that enters the passenger cabin 38 comprises fresh air, or air external to the vehicle 10; or whether the air that enters the passenger cabin 38 comprises recycled or recirculated air, or air that currently exists within the passenger cabin 38 of the vehicle 10. The air inlet system 58 includes the air inlet door 68 and an inlet door actuator 70. The air inlet door 68 is movable by the inlet door actuator 70 between a first, opened position, in which fresh air or air external to the vehicle 10 is drawn in by the HVAC blower 64 (fresh mode); and a second, closed position, in which air within the passenger cabin 38 is recycled or recirculated by the HVAC blower 64 (recycle mode). In one example, the air inlet door 68 is movably or pivotally coupled to a duct in fluid communication with the HVAC blower 64. The air inlet door 68 includes a linkage 68a, which connects the air inlet door 68 to the inlet door actuator 70.

With reference to FIG. 1, the inlet door actuator 70 is in communication with the cabin air quality control module 20 over the communication architecture 48. The inlet door actuator 70 comprises an electric actuator, which is responsive to one or more control signals from the cabin air quality control module 20 to move the air inlet door 68 to the first position and/or the second position. The inlet door actuator 70 includes an output shaft (not shown), which is coupled to the linkage 68a of the air inlet door 68. Upon receipt of one or more control signals, the inlet door actuator 70 moves or rotates the linkage, thereby pivoting the air inlet door 68 between the first position (fresh mode) and the second position (recycle mode).

Figure 4B:
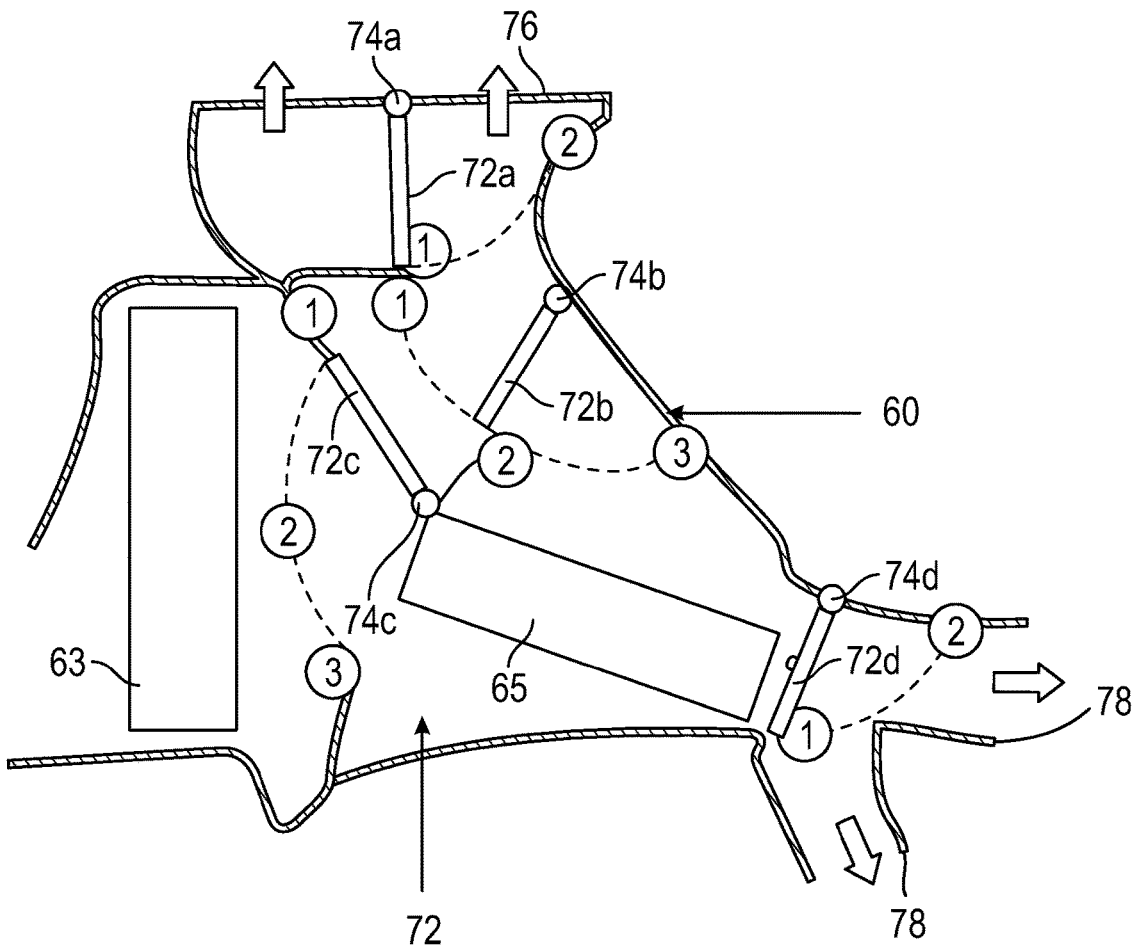
FIG. 4B is a schematic perspective view of an outlet and temperature control system of the air quality system for the vehicle of FIG. 1 in accordance with various embodiments.
Figure 5:
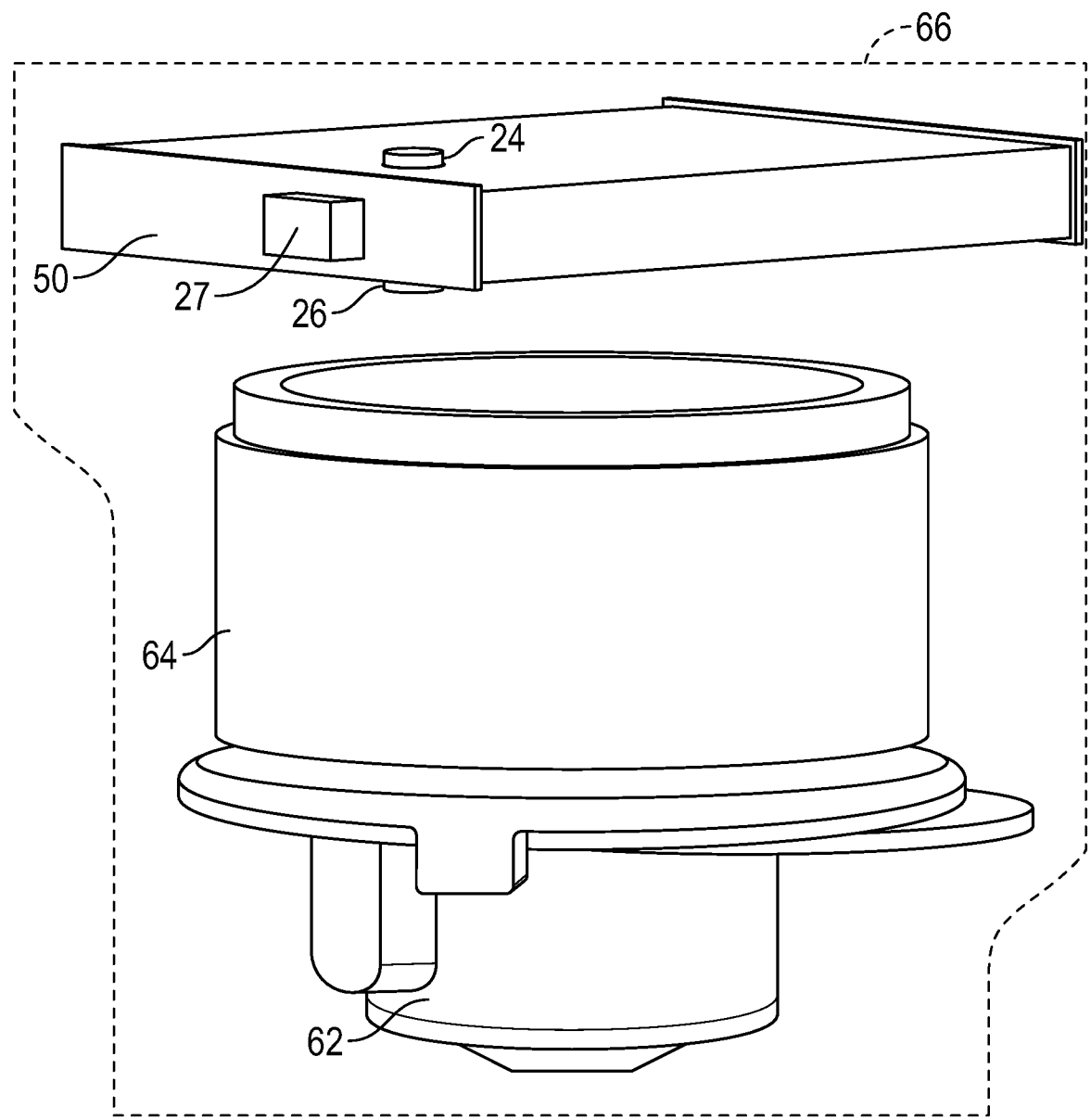
FIG. 5 is a perspective view of a portion of the air quality system of FIG. 4, which illustrates a filter sensor system and fine particulate matter filter.

The outlet and temperature control system 60 controls the output direction of the air from the HVAC blower 64 into the passenger cabin 38. The outlet and temperature control system 60 includes one or more outlet doors 72 and one or more actuators 74, which cooperate to direct the air from the HVAC blower 34 into the passenger cabin 38. In one example, the one or more outlet doors 72 comprise a first outlet door 72a, a second outlet door 72b, a third outlet door 72c and a fourth outlet door 72d; and the one or more actuators 74 comprise a first actuator 74a, a second actuator 74b, a third actuator 74c and a fourth actuator 74d. In this example, each of the outlet doors 72a, 72b, 72d is movable by a respective actuator 74a, 74b, 74d between various positions, such as one or more of a first position (1), a second position (2) and a third position (3), to define an outlet airflow mode, as illustrated in FIG. 4B. The third outlet door 72c controls the temperature of the air that enters into the passenger cabin 38, and is movable by the third actuator 74c into various positions, such as one or more of a first position (1), a second position (2) and a third position (3), as shown in FIG. 4B, based on a selected temperature or temperature range for the passenger cabin 38. As illustrated in FIG. 4B, each of the outlet doors 72a-72d are movable along a path, indicated by dashed lines, and each of the outlet doors 72a-72d can be positioned at any point or selected position along that path to define a particular outlet airflow mode, as is known to one of skill in the art. With reference back to FIG. 4, each of the outlet doors 72a-72d is movably or pivotably coupled to a duct and is in fluid communication with the HVAC blower 64 to receive an airflow from the HVAC blower 64. Each of the outlet doors 72a-72d includes a respective linkage 73a-73d, which connects the respective outlet door 72a-72d to the respective actuator 74a-74d.

With reference to FIG. 1, each of the actuators 74a-74d is in communication with the cabin air quality control module 20 over the communication architecture 48. Each of the actuators 74a-74d comprises an electric actuator, which is responsive to one or more control signals from the cabin air quality control module 20 to move the respective one of the outlet doors 72a, 72b, 72d to a selected position, such as one of the first position, the second position and/or the third position; and to move the third outlet door 72c to positions between (and including) the first position, the second position and the third position. Each of the actuators 74a-74d includes an output shaft (not shown), which is coupled to the respective linkage 73a-73d of the respective outlet door 72a-72d. Upon receipt of one or more control signals, each of the actuators 74a-74d moves or rotates the linkage, thereby pivoting the respective outlet door 72a-72d to the selected position (e.g. a point along the respective path of movement for each of the outlet doors 72a-72d, as illustrated in FIG. 4B).

The outlet and temperature control system 60 moves the outlet doors 72a, 72b, 72d between various positions to define one or more outlet airflow modes for the airflow into the passenger cabin 38, and moves the third outlet door 72c to define a desired temperature for the outlet airflow. Generally, the third outlet door 72c is movable to one of various positions based on a selected temperature or temperature range received via an input device to direct the airflow through at least one of the evaporator 63 and the heater 65, as is known by one of skill in the art.

In one example, the outlet doors 72a-72d are movable to define the following outlet airflow modes: a defrost/demist mode, a ventilation mode, a bi-level mode, a floor mode and a floor and demist mode. With reference to FIG. 2, in the defrost/demist mode, one or more ducts downstream from the outlet and temperature control system 60 direct air to one or more outlets 79 adjacent to a windshield of the vehicle 10. In the ventilation mode, one or more ducts downstream from the outlet and temperature control system 60 direct air flow to one or more outlets 76 located near a face of an occupant (i.e. the one or more outlets 76 are coupled to an instrument panel 77 of the vehicle 10 via ducts 75a-75d of FIG. 4A). In the floor mode, one or more ducts downstream from the outlet and temperature control system 60 direct air flow to one or more outlets 78 located near feet of an occupant (i.e. the one or more outlets 78 are located near the opening 46 of the console 42). In the bi-level mode, the one or more ducts downstream from the outlet and temperature control system 60 direct air flow to the outlets 76 and the outlets 78. In the floor and demist mode, the one or more ducts downstream from the outlet and temperature control system 60 direct air flow to the outlets 79 and the outlets 78. The third outlet door 72c is movable to enable flow through at least one of the evaporator 63 and the heater 65.

Each of the actuators 74a-74d is responsive to one or more control signals from the cabin air quality control module 20 to direct airflow through one or more of the outlets 76, 78, 79. Thus, each of the actuators 74a-74d control the airflow such that airflow exits into the passenger cabin 38 at the outlets 76 and the outlets 78 (bi-level mode); at the outlets 79 and the outlets 78 (floor and demist mode); at only the outlets 76 (ventilation mode); only at the outlets 79 (defrost/demist mode); or at only the outlets 78 (floor mode). The following table provides an example for the positions of the first outlet door 72a, the second outlet door 72b, the third outlet door 72c and the fourth outlet door 72d to achieve the particular outlet airflow mode:

TABLE 1

OUTLET DOOR POSITION FOR OUTLET AIRFLOW MODE

| | First Outlet Door Position | Second Outlet Door Position | Third Outlet Door Position | Fourth Outlet Door Position |
|---|---|---|---|---|
| Defrost/Demist Mode | Second | A selected position along path illustrated in FIG. 4B | First | A selected position along path illustrated in FIG. 4B |
| Ventilation Mode | First | A selected position along path illustrated in FIG. 4B | First | A selected position along path illustrated in FIG. 4B |
| Bi-Level Mode | First | A selected position along path illustrated in FIG. 4B | A selected position along path illustrated in FIG. 4B | A selected position along path illustrated in FIG. 4B |
| Floor Mode | First | First | A selected position along path illustrated in FIG. 4B | A selected position along path illustrated in FIG. 4B |
| Floor and Demist Mode | Second | A selected position along path illustrated in FIG. 4B | A selected position along path illustrated in FIG. 4B | A selected position along path illustrated in FIG. 4B |

The at least one user interface 18 is communicatively coupled to the cabin air quality control module 20 over the communication architecture 48. In one example, the at least one user interface 18 comprises an instrument panel user interface 80, an HVAC user interface 82 and a visor user interface 84. It will be understood that the vehicle 10 can include one, more than one or all of the user interfaces 18, if desired.

Figure 6:
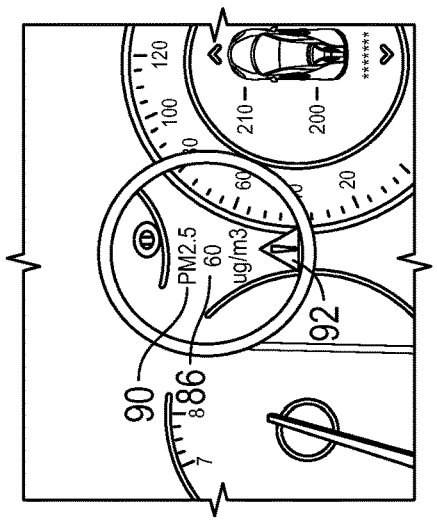
FIG. 6 is an exemplary instrument panel user interface for the vehicle of FIG. 1, in accordance with various embodiments.

The instrument panel user interface 80 includes an instrument panel display 86, and optionally includes at least one instrument panel input device 88, which are each in communication with the cabin air quality control module 20 over the communication architecture 48. The instrument panel display 86 generally comprises a flat panel display, which is implemented with a portion of an instrument panel of the vehicle 10. The instrument panel display 86 comprises any suitable technology for displaying information, including, but not limited to, a liquid crystal display (LCD), organic light emitting diode (OLED), plasma, or a cathode ray tube (CRT). Generally, with reference to FIG. 6, the instrument panel display 86 displays a value 90 of a level or concentration of the PM 2.5 in micrograms per cubic meter of air ($\mu g/m^3$) with a graphical indicator of the air quality, as will be discussed in greater detail herein. It should be noted that the PM 2.5 concentration level may be displayed in any desired unit, and thus, the use of micrograms per cubic meter of air is merely exemplary. The instrument panel display 86 also displays a change filter indicator 92. In various embodiments, the at least one instrument panel input device 88 comprises any device that receives input and/or commands from the user, such as a button, lever, etc. For example, the at least one instrument panel input device 88 receives as input a command to activate the air quality control system 12 and/or a mode of operation for the air quality control system 12. The at least one instrument panel input device 88 can also receive an override request for the operation of the air quality system 16.

Figure 7:
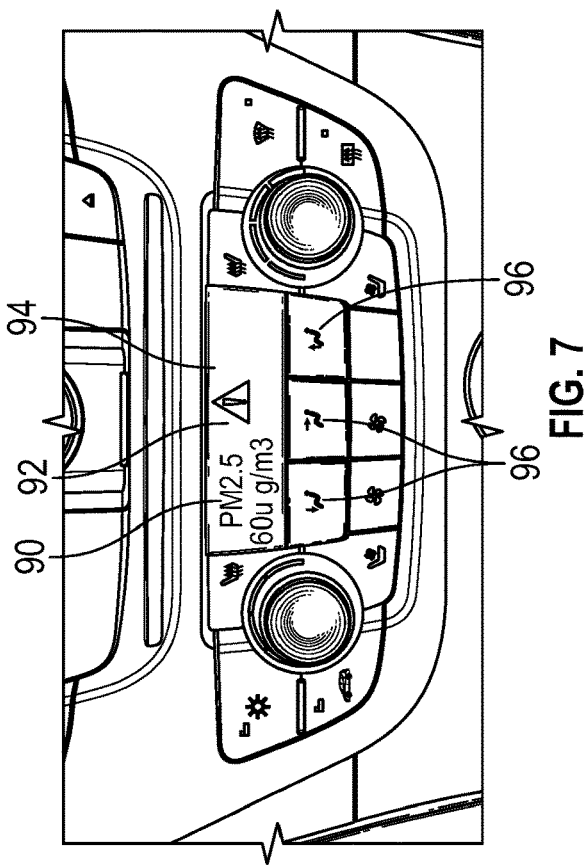
FIG. 7 is an exemplary heating, ventilation and cooling (HVAC) user interface for the vehicle of FIG. 1, in accordance with various embodiments.

The HVAC user interface 82 includes an HVAC display 94 and at least one HVAC input device 96, which are each in communication with the cabin air quality control module 20 over the communication architecture 48. The HVAC display 94 generally comprises a flat panel display, which is implemented with a portion of an instrument panel of the vehicle 10, and may be part of an infotainment system of the vehicle 10. The HVAC display 94 comprises any suitable technology for displaying information, including, but not limited to, a liquid crystal display (LCD), organic light emitting diode (OLED), plasma, or a cathode ray tube (CRT). Generally, with reference to FIG. 7, the HVAC display 94 displays the value 90 of the level or concentration of the PM 2.5 in micrograms per cubic meter of air ($\mu g/m^3$) with the graphical indicator of the air quality. The HVAC display 94 also displays the change filter indicator 92. In various embodiments, the at least one HVAC input device 96 comprises any device that receives input and/or commands from the user, such as a button, lever, etc., and can comprise a touchscreen layer associated with the HVAC display 94. For example, the at least one HVAC input device 96 receives as input a command to activate the air quality control system 12 and/or a mode of operation for the air quality control system 12. The at least one HVAC input device 96 can also receive an override request for the operation of the air quality system 16.

Figure 8:
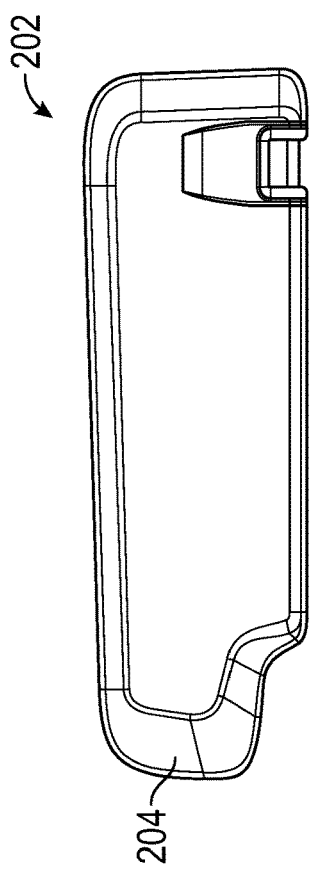
FIG. 8 is an exemplary visor user interface for the vehicle of FIG. 1, in accordance with various embodiments, which shows the visor in a first position.
Figure 9:
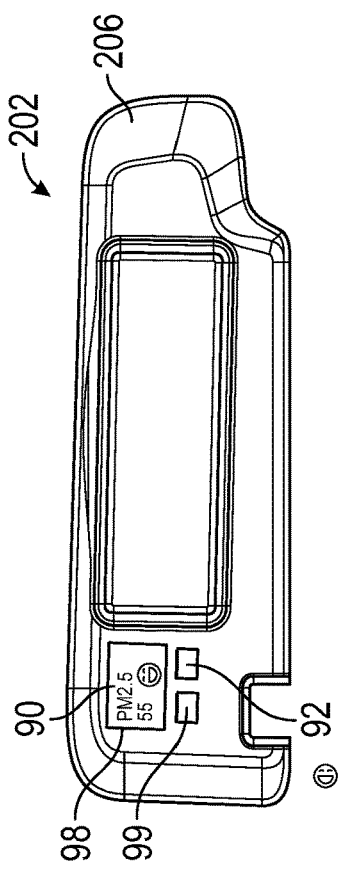
FIG. 9 is an exemplary visor user interface for the vehicle of FIG. 1, in accordance with various embodiments, which shows the visor in a second position.

The visor user interface 84 includes a visor display 98 and at least one visor input device 99, which are each in communication with the cabin air quality control module 20 over the communication architecture 48. With reference to FIGS. 8 and 9, the visor display 98 generally comprises a flat panel display, which is implemented with a portion of a visor 202. In one example, the visor 202 has a first side 204 (FIG. 8) opposite a second side 206 (FIG. 9). The second side 206 is generally adjacent to a headliner of the vehicle 10 when the visor 202 is in a stored position. The visor 202 is manually movable or pivotable to expose the second side 206. In this example, the visor display 98 and visor input device 99 are coupled to the second side 206 of the visor 202. It will be understood, however, that the visor display 98 and the visor input device 99 can be coupled to the first side 204, if desired.

The visor display 98 comprises any suitable technology for displaying information, including, but not limited to, a liquid crystal display (LCD), organic light emitting diode (OLED), plasma, or a cathode ray tube (CRT). With reference to FIG. 9, the visor display 98 displays the value 90 of the level or concentration of the PM 2.5 in micrograms per cubic meter of air ($\mu g/m^3$) with the graphical indicator of the air quality. The visor display 98 also displays the change filter indicator 92. In various embodiments, the at least one visor input device 99 comprises any device that receives input and/or commands from the user, such as a button, lever, etc., and can comprise a touchscreen layer associated with the visor display 98. For example, the at least one visor input device 99 receives as input a command to activate the air quality control system 12 and/or a mode of operation for the air quality control system 12. The at least one visor input device 99 can also receive an override request for the operation of the air quality system 16.

In various embodiments, the cabin air quality control module 20 outputs one or more control signals to the sensor motor 32 to drive the blower 34 to observe an airflow based on the systems and methods of the present disclosure. The cabin air quality control module 20 outputs one or more control signals to the HVAC motor 62 to drive the HVAC blower 64 to generate an airflow through the duct 66 and into the passenger cabin 38 based on the sensor signals from the fine dust sensor system 22, input received from the input devices 88, 96 and 99, and based on the systems and methods of the present disclosure. The cabin air quality control module 20 outputs one or more control signals to the inlet door actuator 70 based on the sensor signals from the one or more sensors 14 and based on the systems and methods of the present disclosure. The cabin air quality control module 20 also outputs one or more control signals to the ionizers 56a, 56b to activate the emission devices 57a, 57b based on the sensor signals from the fine dust sensor system 22, and based on the systems and methods of the present disclosure. The cabin air quality control module 20 outputs one or more control signals to one or more of the actuators 74a-74d to control the outlet airflow mode for the outlets 76, 78, 79 based on the sensor signals from the one or more sensors 14 and based on the systems and methods of the present disclosure. The cabin air quality control module 20 outputs a user interface, for display on the one or more of the instrument panel display 86, the HVAC display 94 and/or the visor display 98, based on the sensor signals from the fine dust sensor system 22, and based on the systems and methods of the present disclosure.

Figure 10:
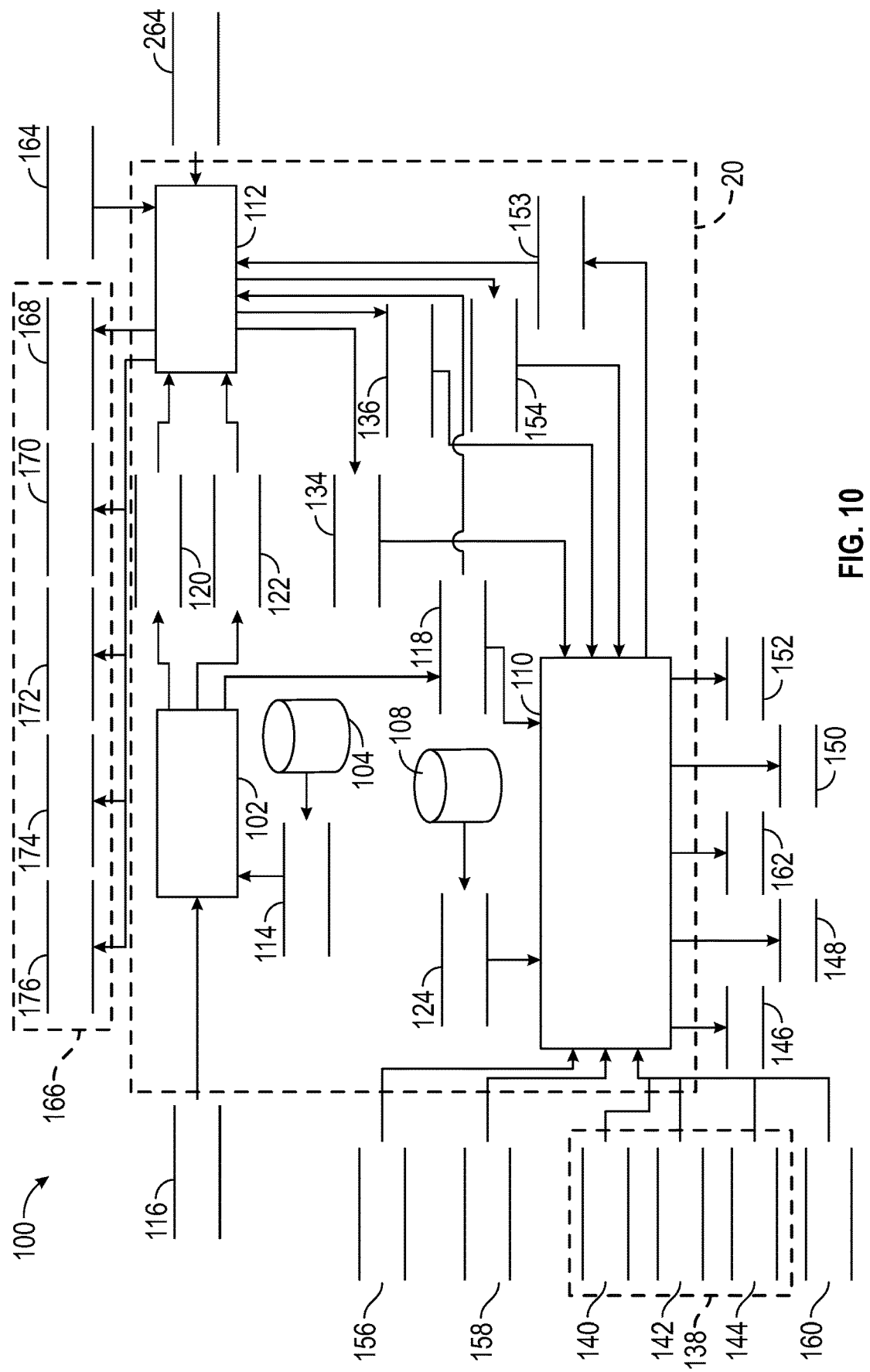
FIG. 10 is a dataflow diagram illustrating a control system of the air quality control system of FIG. 1 in accordance with various embodiments.

Referring now to FIG. 10, and with continued reference to FIG. 1, a dataflow diagram illustrates various embodiments of a control system 100 for the air quality control system 12, which may be embedded within the cabin air quality control module 20. Various embodiments of the control system 100 according to the present disclosure can include any number of sub-modules embedded within the cabin air quality control module 20. As can be appreciated, the sub-modules shown in FIG. 10 can be combined and/or further partitioned to similarly control the sensor motor 32, the HVAC motor 62, the inlet door actuator 70, the actuators 74a-74d, the ionizers 56a, 56b and output the user interface for display on the HVAC display 94, the instrument panel display 86 and/or the visor display 98. Inputs to the control system 100 may be received from the fine dust sensor system 22 (FIG. 1), received from the at least one input device 88, 96, 99 of the user interfaces 80, 82, 84 (FIG. 1), received from other control modules (not shown) associated with the vehicle 10, and/or determined/modeled by other sub-modules (not shown) within the cabin air quality control module 20. In various embodiments, the cabin air quality control module 20 includes a level determination module 102, a quality datastore 104, a door position datastore 108, an air quality control module 110 and a user interface (UI) control module 112.

The quality datastore 104 stores one or more tables (e.g., lookup tables) that indicate an air quality based on a PM 2.5 concentration level observed by the fine dust sensor 36. In other words, the quality datastore 104 stores one or more tables that provide a quality value 114 for air in the passenger cabin 38 based on various PM 2.5 concentration levels. In various embodiments, the tables may be interpolation tables that are defined by one or more indexes. A quality value 114 provided by at least one of the tables indicates an air quality for the air in the passenger cabin 38 based on the PM 2.5 concentration level. An example quality value 114 can comprise an air quality rating, such as good (PM 2.5 concentration of about 0-35 $\mu g/m^3$); moderate (PM 2.5 concentration of about 36-115 $\mu g/m^3$); and poor (PM 2.5 concentration of greater than about 116 $\mu g/m^3$). It should be noted that these air quality ratings are merely exemplary. As an example, one or more tables can be indexed by various parameters such as, but not limited to, PM 2.5 concentration level, to provide the quality value 114.

The level determination module 102 receives as input fine dust sensor data 116. The fine dust sensor data 116 comprises the sensor signals from the fine dust sensor 36. The level determination module 102 processes the fine dust sensor data 116 and determines a concentration level 118. The level determination module 102 sets the concentration level 118 for the air quality control module 110 and the UI control module 112. The concentration level 118 comprises the PM 2.5 concentration level as observed by the fine dust sensor 36.

Based on the receipt of the fine dust sensor data 116, the level determination module 102 queries the quality datastore 104 and retrieves the quality value 114 associated with the PM 2.5 concentration level observed and measured by the fine dust sensor 36. Based on the retrieved quality value 114, the level determination module 102 sets air quality data 120 for the UI control module 112. In one example, the air quality data 120 comprises one of good, moderate or poor.

The level determination module 102 also processes the fine dust sensor data 116 to determine whether the fine dust sensor 36 is operating properly. For example, the level determination module 102 determines whether the sensor signals received in the fine dust sensor data 116 are acceptable readings for PM 2.5 concentration levels. If the level determination module 102 determines the fine dust sensor data 116 does not comprise acceptable readings, such that the fine dust sensor 36 is not operating properly, the level determination module sets service 122 for the UI control module 112. The service 122 comprises a notification for the UI control module 112 that the fine dust sensor 36 is not operating properly and needs service.

The door position datastore 108 stores one or more tables (e.g. look up tables) that provide the positions for the outlet doors 72a-72d based on an outlet airflow mode for the outlets 76, 78, 79. In other words, the door position datastore 108 stores one or more tables that provide a door position 124 for the outlet doors 72a-72d based on the outlet airflow mode (e.g. bi-level mode; floor and demist mode; ventilation mode; defrost/demist mode; or floor mode) for the outlets 76, 78, 79. In various embodiments, the door position datastore 108 stores TABLE 1, discussed herein above. The door position 124 provided by at least one of the tables indicates a position for each of the respective outlet doors 72a-72d (e.g. a point along the respective path of movement for each of the outlet doors 72a-72d, as illustrated in FIG. 4B) to achieve the outlet airflow mode. As an example, one or more tables can be indexed by various parameters such as, but not limited to, the outlet airflow mode, to provide the door position 124.

The air quality control module 110 receives as input a mode 134 from the UI control module 112. The mode 134 comprises an automatic mode or a manual mode for the operation of the air quality control system 12, as received as input from the at least one user interface 18. If no input data has been received, the air quality control module 110 determines the mode 134 as a default or factory-set mode. In one example, the default mode 134 comprises the automatic mode. In the automatic mode, the air quality control module 110 outputs one or more control signals to the HVAC motor 62, the inlet door actuator 70, the ionizer 56a, the ionizer 56b and the actuators 74a-74d without receipt of user input based on the concentration level 118. In the manual mode, the air quality control module 110 outputs one or more control signals to the HVAC motor 62, the inlet door actuator 70, the ionizer 56a, the ionizer 56b and the actuators 74a-74d based on the concentration level 118 and a command 136 received from the UI control module 112. The command 136 comprises a request to operate the air quality system 16, as received as input from one or more of the input devices 88, 96, 99.

The air quality control module 110 receives as input status data 138. The status data 138 comprises a current status of the air quality system 16, such as a blower status 140, an inlet door status 142 and an outlet mode status 144. The status data 138 can be provided by other modules associated with the vehicle 10, or can be determined by the air quality control module 110 based on signals and/or data received from the HVAC motor 62, inlet door actuator 70 and each of the actuators 74a-74d. The blower status 140 comprises a status for the HVAC blower 64, such as high, medium or low, which can be determined based on an output speed of the HVAC motor 62. The inlet door status 142 comprises a status of the air inlet door 68, such as opened or closed, which can be determined based on a position of the inlet door actuator 70. The outlet mode status 144 comprises the current outlet airflow mode of the outlet control system, such as bi-level mode, floor and demist mode, ventilation mode, defrost/demist mode, or floor mode based on the positions of the actuators 74a-74d.

The air quality control module 110 also receives as input the concentration level 118. Based on the mode 134, the status data 138 and the concentration level 118, the air quality control module 110 outputs blower data 146, inlet door data 148, ionizer data 150, outlet door data 152 and warning 153. Based on the automatic mode as the mode 134, the air quality control module 110 outputs the blower data 146, the inlet door data 148, the ionizer data 150 and the outlet door data 152 substantially automatically or without receipt of input data based on the concentration level 118. Based on the manual mode as the mode 134, the air quality control module 110 sets a warning 153 for the UI control module 112 based on the concentration level 118. The warning 153 comprises a notification to activate the air quality system 16 based on the determined concentration level 118. The air quality control module 110 receives an override 154 as input from the UI control module 112. The override 154 comprises a request to override the automatic mode based on the concentration level 118. Based on the receipt of the override 154, the air quality control module 110 also sets the warning 153 for the UI control module 112. The air quality control module 110 also receives as input the command 136, and outputs the blower data 146, the inlet door data 148, the ionizer data 150 and the outlet door data 152 based on the concentration level 118 upon receipt of the command 136.

The blower data 146 comprises one or more control signals for the HVAC motor 62 to drive the HVAC blower 64 at a desired speed (high, medium, low), based on the blower status 140. The inlet door data 148 comprises one or more control signals for the inlet door actuator 70 to move the air inlet door 68 to the first position or the second position based on the inlet door status 142. The ionizer data 150 comprises one or more control signals for the ionizer 56a and the ionizer 56b to activate or deactivate the ionizer 56a and the ionizer 56b. The outlet door data 152 comprises one or more control signals for one or more of the actuators 74a-74d to move the respective one of the outlet doors 72a-72d to the determined position (e.g. a point along the respective path of movement for each of the outlet doors 72a-72d, as illustrated in FIG. 4B) to provide the determined outlet airflow mode (bi-level mode, floor and demist mode, ventilation mode, defrost/demist mode, or floor mode) based on the outlet mode status 144.

In one example, the air quality control module 110 determines whether the concentration level 118 is below a low threshold. For example, the air quality control module 110 determines whether the concentration level 118 is less than about 35 µg/m³. If the concentration level 118 is above the low threshold, the air quality control module 110, in the manual mode, sets the warning 153 for the UI control module 112. Based on the determination that the concentration level 118 is above the low threshold, in the automatic mode or upon receipt of the command 136, the air quality control module 110 determines whether the concentration level 118 is within a first range. For example, the air quality control module 110 determines whether the concentration level 118 is greater than about 35 µg/m$^3$ and less than about 75 µg/m$^3$. If the concentration level 118 is determined to be within the first range, the air quality control module 110 determines whether the override 154 has been received as input in the automatic mode. The air quality control module 110 receives the override 154 as input from the UI control module 112. The override 154 comprises a request to override the automatic mode based on the concentration level 118.

Based on the determination that the concentration level 118 is in the first range and the status data 138, the air quality control module 110 outputs the blower data 146 and outlet door data 152 for the first range. In the first range, the blower data 146 comprises one or more control signals to the HVAC motor 62 to drive the HVAC blower 64 at a low speed. In the first range, the air quality control module 110 queries the door position datastore 108 and retrieves the door position 124 for the bi-level mode. Based on the door position 124 and the outlet mode status 144, the outlet door data 152 comprises one or more control signals to the actuators 74a-74d to adjust the positions of the outlet doors 72a-72d to provide bi-level outlet airflow. The air quality control module 110 also outputs ionizer data 150 to activate the ionizer 56a and the ionizer 56b.

Based on the concentration level 118, the air quality control module 110 also determines whether the concentration level 118 is within a second range. For example, the air quality control module 110 determines whether the concentration level 118 is greater than about 75 µg/m$^3$ and less than about 115 µg/m$^3$. If the concentration level 118 is determined to be within the second range, the air quality control module 110 outputs the blower data 146 and the outlet door data 152 for the second range based on the determination of the second range and the status data 138. In the second range, the blower data 146 comprises one or more control signals to the HVAC motor 62 to drive the HVAC blower 64 at a medium speed. In the second range, the air quality control module 110 queries the door position datastore 108 and retrieves the door position 124 for the bi-level mode. Based on the door position 124 and the outlet mode status 144, the outlet door data 152 comprises one or more control signals to the actuators 74a-74d to adjust the positions of the outlet doors 72a-72d to provide bi-level outlet airflow. The air quality control module 110 also outputs ionizer data 150 to activate the ionizer 56a and the ionizer 56b. The air quality control module 110 also determines whether the override 154 has been received as input in the automatic mode.

Based on the concentration level 118, the air quality control module 110 also determines whether the concentration level 118 is within a third range. For example, the air quality control module 110 determines whether the concentration level 118 is greater than about 115 µg/m$^3$. If the concentration level 118 is determined to be within the third range, the air quality control module 110 outputs the blower data 146, the inlet door data 148 and the outlet door data 152 for the third range based on this determination and the status data 138, and the air quality control module 110 starts a timer. In the third range, the blower data 146 comprises one or more control signals to the HVAC motor 62 to drive the HVAC blower 64 at a high speed. In the third range, the air quality control module 110 queries the door position datastore 108 and retrieves the door position 124 for the floor mode. Based on the door position 124 and the outlet mode status 144, the outlet door data 152 the outlet door data 152 comprises one or more control signals to the actuators 74a-74d to adjust the positions of the outlet doors 72a-72d to provide floor mode outlet airflow (outlets 78). In the third range, the inlet door data 148 comprises one or more control signals to the inlet door actuator 70 to move the air inlet door 68 to the second, closed position. The air quality control module 110 also outputs ionizer data 150 to activate the ionizer 56a and the ionizer 56b. The air quality control module 110 also determines whether the override 154 has been received as input in the automatic mode.

After the expiration of a predetermined period of time, such as about 5 minutes, based on the timer, the air quality control module 110 queries the door position datastore 108 and retrieves the door position 124 for the bi-level mode. Based on the door position 124 and the outlet mode status 144, the air quality control module 110 outputs the outlet door data 152, which comprises one or more control signals to the actuators 74a-74d to adjust the positions of the outlet doors 72a-72d to provide bi-level outlet airflow. It should be noted that the PM 2.5 concentration levels within each of the low threshold, the first range, the second range and the third range are merely exemplary, and moreover, the air quality control module 110 can operate based on additional ranges or thresholds.

When the concentration level 118 is determined to be in the first range or the second range, the air quality control module 110 receives as input $CO_x$ sensor data 156 and $NO_x$ sensor data 158. The $CO_x$ sensor data 156 comprises the sensor signals from the first chemical sensor 28, and the $NO_x$ sensor data 158 comprises the sensor signals from the second chemical sensor 30. The air quality control module 110 processes the $CO_x$ sensor data 156, and determines whether the $CO_x$ sensor data 156 is greater than a $CO_x$ threshold. If the $CO_x$ sensor data 156 is greater than the $CO_x$ threshold, the air quality control module 110 outputs the inlet door data 148, which comprises one or more control signals to the inlet door actuator 70 to move the air inlet door 68 to the first, open position (fresh mode).

The air quality control module 110 processes the $NO_x$ sensor data 158, and determines whether the $NO_x$ sensor data 158 is greater than a $NO_x$ threshold. If the $NO_x$ sensor data 158 is greater than the $NO_x$ threshold, the air quality control module 110 outputs the inlet door data 148, which comprises one or more control signals to the inlet door actuator 70 to move the air inlet door 68 to the second, closed position (recycle mode).

The air quality control module 110 also receives as input ignition status 160. The ignition status 160 comprises a status of an ignition of the vehicle 10, such as on or off, which is provided by other modules associated with the vehicle 10 over a communications architecture, such as the communication architecture 48. Based on the ignition status 160 as on, the air quality control module 110 outputs sensor data 162. The sensor data 162 comprises one or more control signals to the sensor motor 32 to drive the blower 34 to draw air into the cavity 44 for observation by the fine dust sensor 36.

The UI control module 112 receives input data 164. The input data 164 comprises input received to the at least one input device 88, 96 and 99. The UI control module 112 processes the input data 164 and sets the mode 134 and the command 136 for the air quality control module 110.

The UI control module 112 also receives as input the concentration level 118, the air quality data 120, the service 122, the status notification 264 and the warning 153. The UI control module 112 processes the concentration level 118, the air quality data 120, the service 122, the status notification 132 and the warning 153, and generates user interface data 166. The user interface data 166 includes a concentration 168, a quality level indicator 170, a filter notification 172, a sensor notification 174 and a warning notification 176 for display on one or more of the displays 86, 94 and 98. The concentration 168 comprises a textual indication of the PM 2.5 concentration level, as indicated by the concentration level 118. For example, the concentration 168 comprises the text: "PM 2.5 X," and X comprises the PM 2.5 concentration level from the concentration level 118. The quality level indicator 170 comprises a graphical indicator of the air quality in the passenger cabin 38, as indicated by the air quality data 120. In one example, the quality level indicator 170 comprises a color associated with the text of the concentration 168. For example, based on the air quality data 120 of good, the quality level indicator 170 comprises a green color, and the concentration 168 text is illustrated in green. In this example, the quality level indicator 170 for the air quality data 120 of moderate comprises a yellow color, and the quality level indicator 170 for the air quality data 120 of poor comprises a red color. It should be noted that these examples of the quality level indicator 170 are merely exemplary, as the quality level indicator 170 for the air quality data 120 of good can also comprise a graphical icon, such as a smiling emoticon, as illustrated in FIG. 9. Thus, the concentration 168 and the quality level indicator 170 generally comprise the value 90 illustrated in FIGS. 6, 7 and 9.

The filter notification 172 comprises a graphical and/or textual indicator for display on one or more of the displays 86, 94, 98, which indicates that the fine particulate matter filter 50 needs to be replaced based on the status notification 264. For example, the filter notification 172 can comprise the change filter indicator 92 illustrated in FIGS. 6, 7 and 9. Alternatively, the filter notification 172 can comprise a textual message, such as: "Change PM 2.5 Filter."

The sensor notification 174 comprises a graphical and/or textual indicator for display on one or more of the displays 86, 94, 98, which indicates that the fine dust sensor 36 needs to be repaired based on the service 122. For example, the sensor notification 174 can comprise a textual message, such as: "Service PM 2.5 Sensor."

The warning notification 176 comprises a graphical and/or textual indicator for display on one or more of the displays 86, 94, 98, which indicates that the PM 2.5 concentration level is above the low threshold, based on the warning 153. For example, the warning notification 176 can comprise a textual message, such as: "PM 2.5 Level High—Activate Air Quality System?"

Figure 10A:
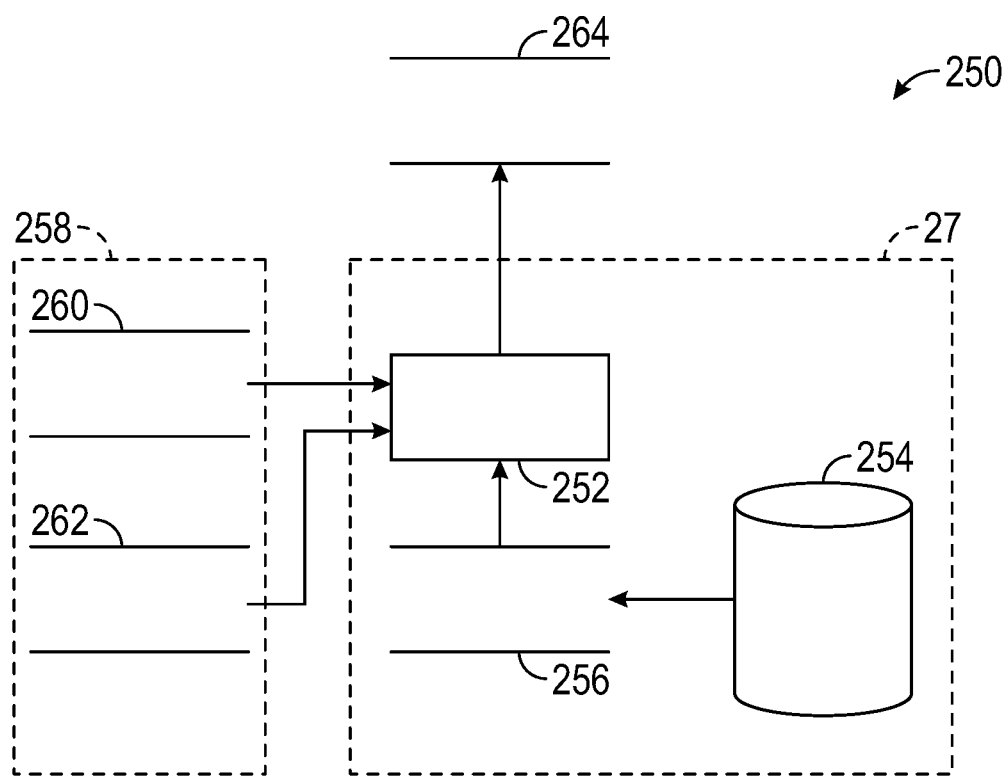
FIG. 10A is a dataflow diagram illustrating a monitor system of the air quality control system of FIG. 1 in accordance with various embodiments.

Referring now to FIG. 10A, and with continued reference to FIG. 1, a dataflow diagram illustrates various embodiments of a control system 250 for the air quality control system 12, which may be embedded within the filter sensor monitor module 27. Various embodiments of the control system 250 according to the present disclosure can include any number of sub-modules embedded within the filter sensor monitor module 27. As can be appreciated, the sub-modules shown in FIG. 10A can be combined and/or further partitioned to similarly determine a status of the fine particulate matter filter 50. Inputs to the control system 250 may be received from the first filter sensor 24 (FIG. 1), the second filter sensor 26 (FIG. 1), received from other control modules (not shown) associated with the vehicle 10, and/or determined/modeled by other sub-modules (not shown) within the filter sensor monitor module 27. In various embodiments, the filter sensor monitor module 27 includes a filter monitor module 252 and an airflow datastore 254.

The airflow datastore 254 stores one or more tables (e.g., lookup tables) that indicate a status of the fine particulate matter filter 50 based on an airflow observed by the first filter sensor 24 and the second filter sensor 26. In other words, the airflow datastore 254 stores one or more tables that provide a filter status 256 for the fine particulate matter filter 50 based on various sensor signals received from the first filter sensor 24 and the second filter sensor 26. In various embodiments, the tables may be interpolation tables that are defined by one or more indexes. The filter status 256 provided by at least one of the tables indicates that the fine particulate matter filter 50 has operating life left, or that the fine particulate matter filter 50 should be replaced based on the airflow through the fine particulate matter filter 50 observed by the first filter sensor 24 and the second filter sensor 26. As an example, one or more tables can be indexed by various parameters such as, but not limited to, airflow observed by the first filter sensor 24 and airflow observed by the second filter sensor 26, or a difference between the airflow observed by the first filter sensor 24 and the airflow observed by the second filter sensor 26, to provide the filter status 256.

The filter monitor module 252 receives as input filter sensor data 258. The filter sensor data 258 comprises first filter sensor data 260 and second filter sensor data 262. The first filter sensor data 260 comprises the sensor signals from the first filter sensor 24, and the second filter sensor data 262 comprises the sensor signals from the second filter sensor 26. The filter monitor module 252 processes the first filter sensor data 260 and second filter sensor data 262, and retrieves the filter status 256 associated with the airflow through the fine particulate matter filter 50 as observed by the first filter sensor 24 and the second filter sensor 26. Based on the retrieved filter status 256, the filter monitor module 252 outputs a status notification 264 for the cabin air quality control module 20. In one example, the status notification 264 comprises a notification to replace the fine particulate matter filter 50.

Figure 11:
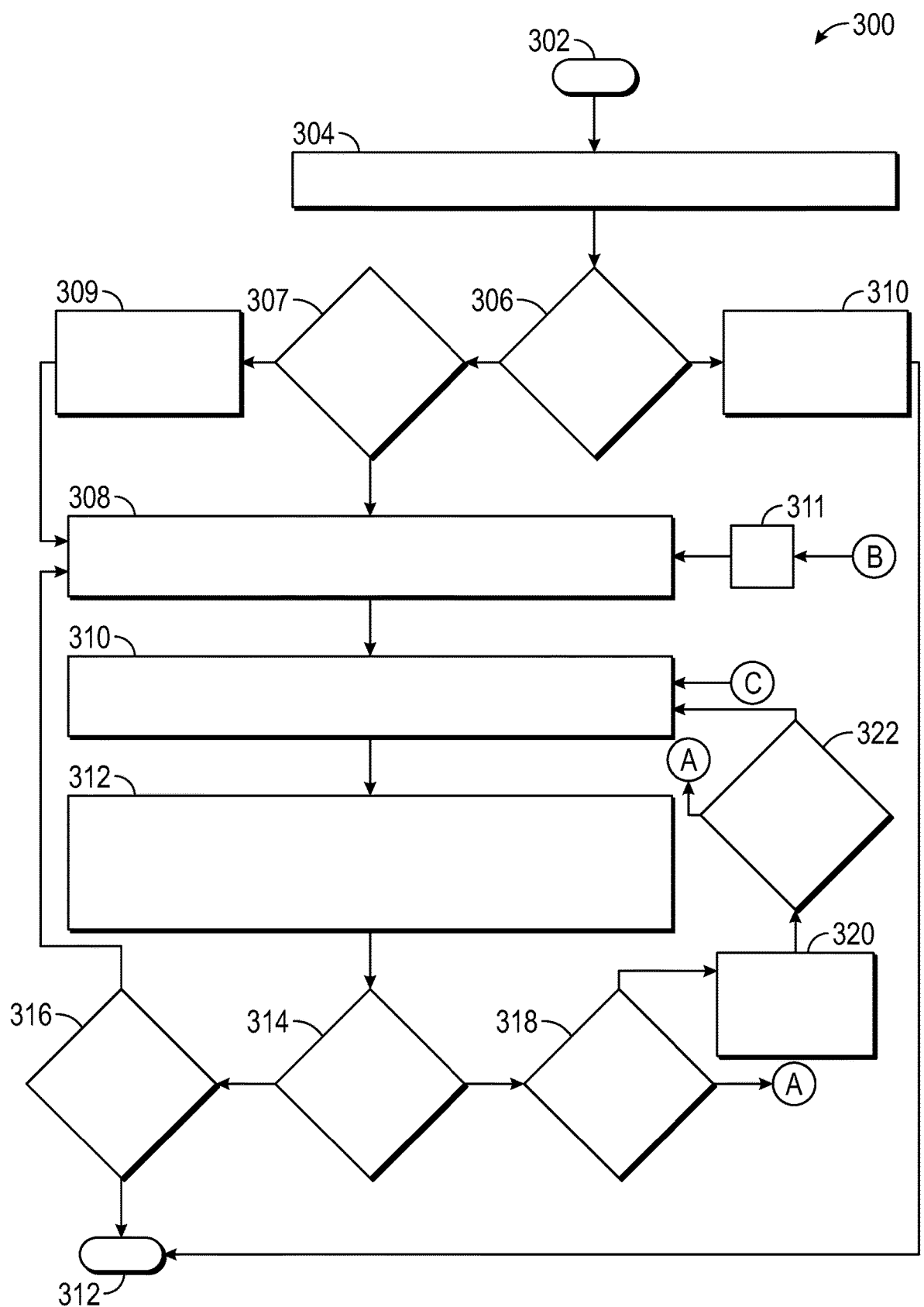
FIG. 11 is a flowchart illustrating a control method of the cabin air quality system of FIG. 1 in accordance with various embodiments.

Referring now to FIG. 11, and with continued reference to FIGS. 1-10, a flowchart illustrates a control method 300 that can be performed by the cabin air quality control module 20 of FIGS. 1 and 10 in accordance with the present disclosure. As can be appreciated in light of the disclosure, the order of operation within the method is not limited to the sequential execution as illustrated in FIG. 11, but may be performed in one or more varying orders as applicable and in accordance with the present disclosure.

In various embodiments, the method can be scheduled to run periodically or based on predetermined events, such as based on a start-up or ignition on status of the vehicle 10.

In one example, the method begins at 302. At 304, the method outputs one or more control signals to the sensor motor 32 to drive the blower 34 to draw air into the cavity 44 for observation by the fine dust sensor 36. At 306, the method determines whether the fine dust sensor 36 has passed a self-check, such that the fine dust sensor 36 is operating properly, based on the fine dust sensor data 116. If the fine dust sensor 36 is determined to be operating properly, the method proceeds to 307. Otherwise, the method outputs the sensor notification 174 to one or more of the displays 86, 84, 98 at 310, and the method ends at 312.

At 307, the method whether the status notification 264 has been received from the filter sensor monitor module 27 that indicates that the fine particulate matter filter 50 needs to be replaced. If true, the method proceeds to 309, and outputs the filter notification 172 for display on at least one of the displays 86, 94 and 98. The method proceeds to 308. If the status notification 264 has not been received, the method also proceeds to 308.

At 308, the method determines a current air quality system status or status data 138, and determines the mode 134. If user input has been received to set the mode 134, the method determines the mode 134 based on the input data 164. If no input data has been received, the method determines the mode 134 as the default mode. At 310, the method determines the PM 2.5 concentration level in the air based on the sensor signals from the fine dust sensor 36. At 312, based on the determined PM 2.5 concentration level, the method determines the air quality level and outputs the user interface data 166, which includes the concentration 168 and the quality level indicator 170. At 314, the method determines whether the PM 2.5 concentration level is below the low threshold. If true, the method proceeds to 316. At 316, the method determines, based on the ignition status 160, whether the ignition of the vehicle 10 is on. If the ignition is on, the method proceeds to 308. Otherwise, the method ends at 312.

If the PM 2.5 concentration level is above the low threshold, at 318, the method determines if the mode 134 is manual mode. If the mode 134 is automatic mode, the method proceeds to A on FIG. 12. If the mode 134 is manual mode, at 320, the method outputs the warning notification 176 for display on one or more of the displays 86, 94, 98. At 322, the method determines whether user input has been received, which comprises the command 136. If user input is received, the method proceeds to A on FIG. 12. Otherwise, the method loops to 310.

Figure 12:
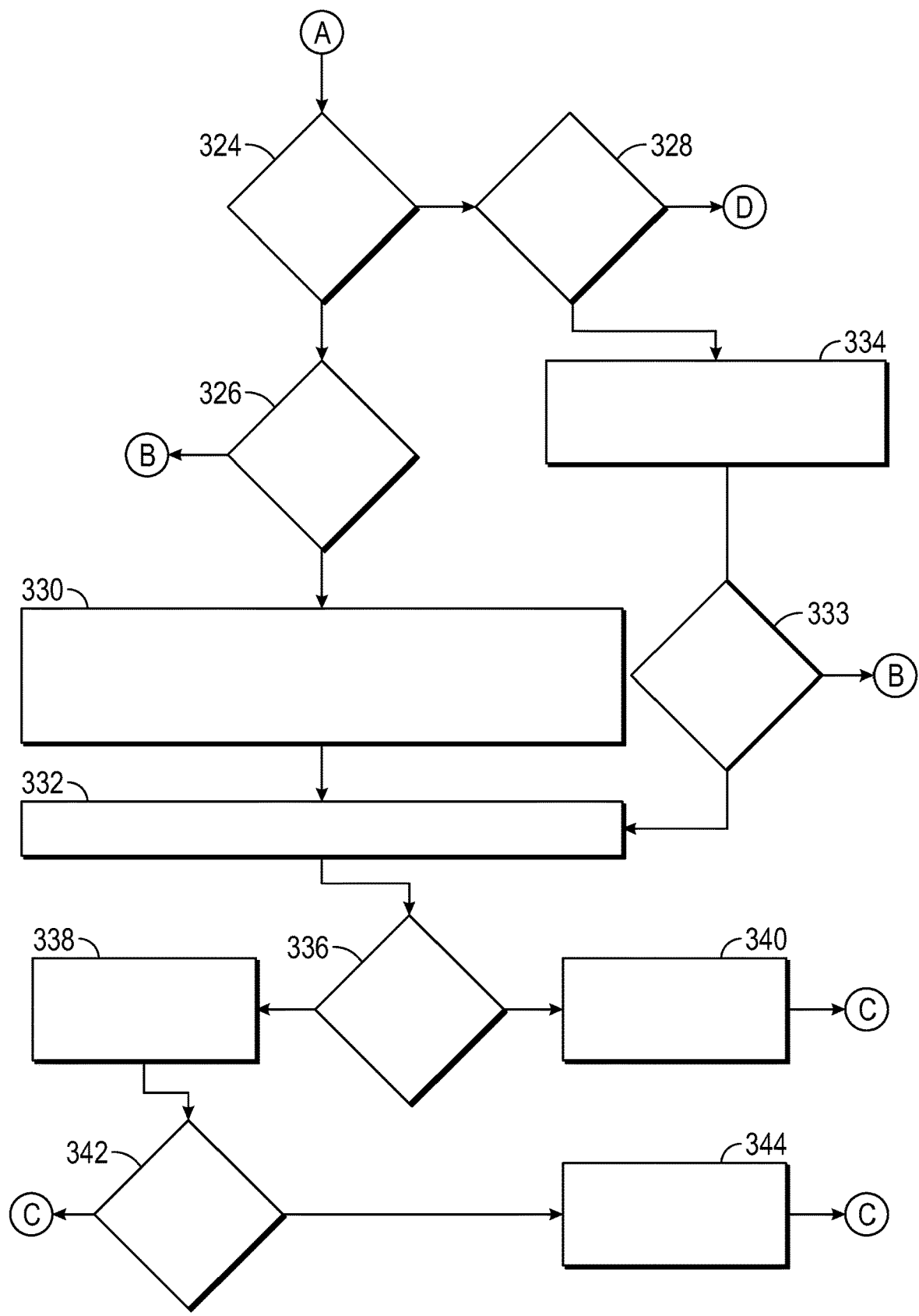
FIG. 12 is a continuation of the flowchart of FIG. 11.

With reference to FIG. 12, from A, the method determines whether the PM 2.5 concentration level is within the first range at 324. If true, the method proceeds to 326. If the PM 2.5 concentration level is outside of the first range, at 328, the method determines if the PM 2.5 concentration level is within the second range. If the PM 2.5 concentration level is outside of the second range, the method proceeds to D on FIG. 13.

Based on the determination that the PM 2.5 concentration level is within the first range, at 326, the method determines whether an override request has been received via one of the input devices 88, 96, 99. If the override 154 has been received, the method proceeds to B on FIG. 11. With brief reference to FIG. 11, from B, at 311, the method outputs the warning notification 176 for display on one or more of the displays 86, 94, 98.

With reference back to FIG. 12, if the override request has not been received, the method proceeds to 330. At 330, the method outputs one or more control signals to the HVAC motor 62, one or more of the actuators 74a-74d, the ionizer 56a and the ionizer 56b based on the current status of the air quality system 16 from the status data 138 and the determined PM 2.5 concentration level as the first range. In this example, in the first range, the method outputs the one or more control signals to the HVAC motor 62 to drive the HVAC blower 64 at a low speed; outputs one or more control signals to the actuators 74a-74d to adjust the positions of the outlet doors 72a-72d to provide bi-level outlet airflow; and outputs one or more control signals to activate the ionizer 56a and the ionizer 56b. The method proceeds to 332.

Based on the determination that the PM 2.5 concentration level is within the second range, at 334, the method outputs one or more control signals to the HVAC motor 62, one or more of the actuators 74a-74d, the ionizer 56a and the ionizer 56b based on the current status of the air quality system 16 from the status data 138 and the determined PM 2.5 concentration level as the second range. In this example, in the second range, the method outputs one or more control signals to the HVAC motor 62 to drive the HVAC blower 64 at a medium speed; outputs one or more control one or more control signals to the actuators 74a-74d to adjust the positions of the outlet doors 72a-72d to provide bi-level outlet airflow; and outputs one or more control signals to activate the ionizer 56a and the ionizer 56b. At 333, the method determines whether an override request has been received via one of the input devices 88, 96, 99. If the override 154 has been received, the method proceeds to B on FIG. 11. Otherwise, the method proceeds to 332.

At 332, the method receives and processes the sensor signals from the second chemical sensor 30 to determine the $NO_x$ concentration within the passenger cabin 38. At 336, the method determines whether the $NO_x$ concentration in the passenger cabin 38 is less than a $NO_x$ threshold. If the $NO_x$ concentration is less than the $NO_x$ threshold, the method proceeds to 338. If the $NO_x$ concentration is greater than the $NO_x$ threshold, at 340, the method outputs one or more control signals to the inlet door actuator 70 to move the air inlet door 68 to the second, closed position (recycle mode). The method proceeds to C on FIG. 11.

At 338, the method receives and processes the sensor signals from the first chemical sensor 28 to determine the $CO_x$ concentration within the passenger cabin 38. At 342, the method determines whether the $CO_x$ concentration is less than a $CO_x$ threshold. If the $CO_x$ concentration is less than a threshold, the method proceeds to C on FIG. 11. Otherwise, at 344, the method outputs one or more control signals to the inlet door actuator 70 to move the air inlet door 68 to the first, opened position (fresh mode). The method proceeds to C on FIG. 11.

Figure 13:
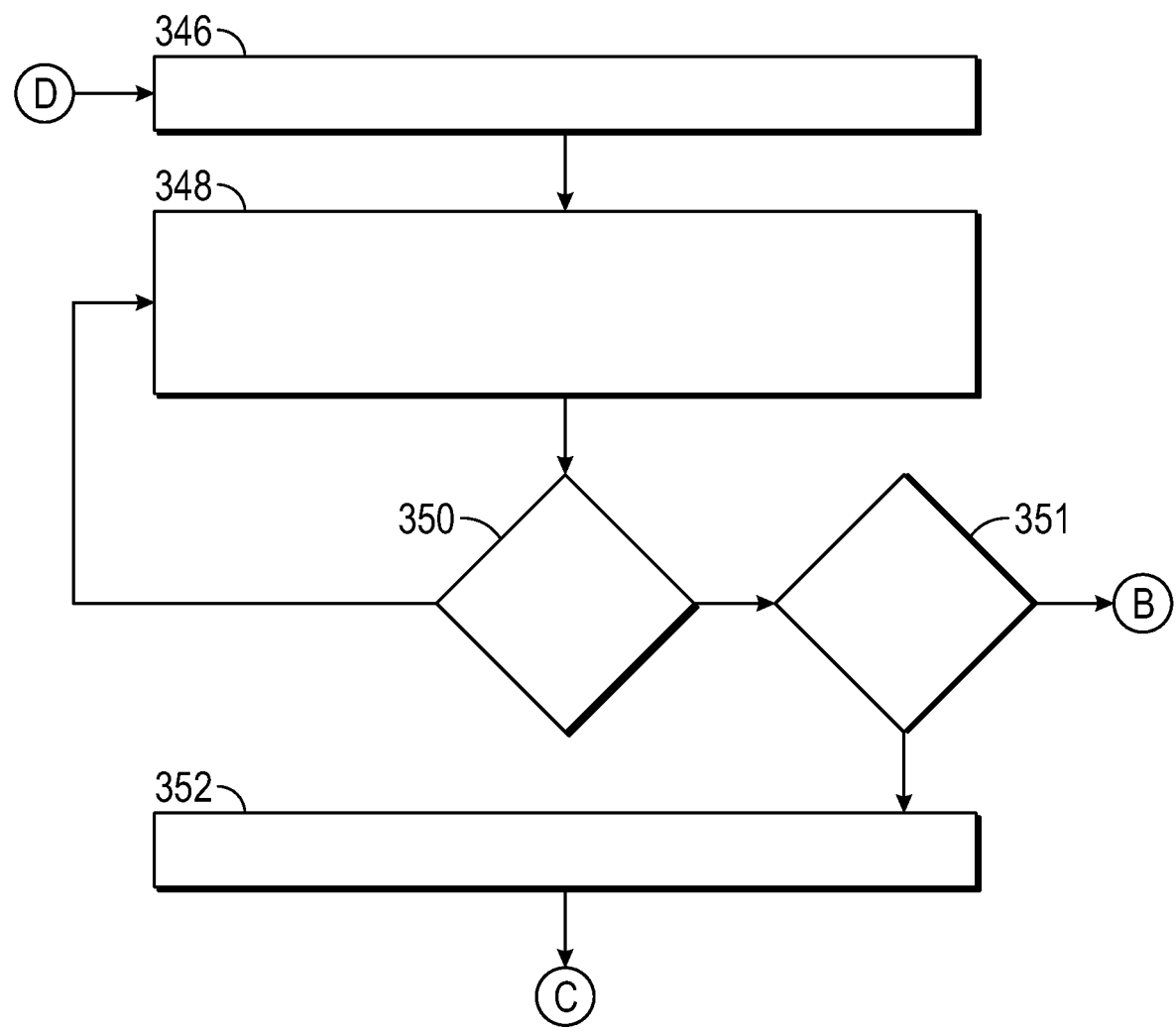
FIG. 13 is a continuation of the flowchart of FIG. 12.

With reference to FIG. 13, from D, the method starts a timer at 346. At 348, the method outputs one or more control signals to the HVAC motor 62, one or more of the actuators 74a-74d, the inlet door actuator 70, the ionizer 56a and the ionizer 56b based on the current status of the air quality system 16 from the status data 138 and the determined PM 2.5 concentration level as the third range. In this example, in the third range, the method outputs one or more control signals to the HVAC motor 62 to drive the HVAC blower 64 at a high speed; outputs one or more control signals to the actuator 74a-74d to adjust the positions of the outlet doors 72a-72d to provide floor mode outlet airflow (outlets 78); outputs one or more control signals to the inlet door actuator 70 to move the air inlet door 68 to the second, closed position; and outputs one or more control signals to activate the ionizer 56a and the ionizer 56b. At 350, the method determines whether the timer is greater than a threshold. In one example, the threshold is about 5 minutes. If the timer is greater than a threshold, the method proceeds to 351. Otherwise, the method loops.

At 351, the method determines whether an override request has been received via one of the input devices 88, 96, 99. If the override 154 has been received, the method proceeds to B on FIG. 11. Otherwise, the method proceeds to 352. At 352, the method outputs one or more control signals to one or more of the actuators 74a-74d to adjust the positions of the outlet doors 72a-72d to provide bi-level outlet airflow. The method proceeds to C on FIG. 11.

Figure 14:
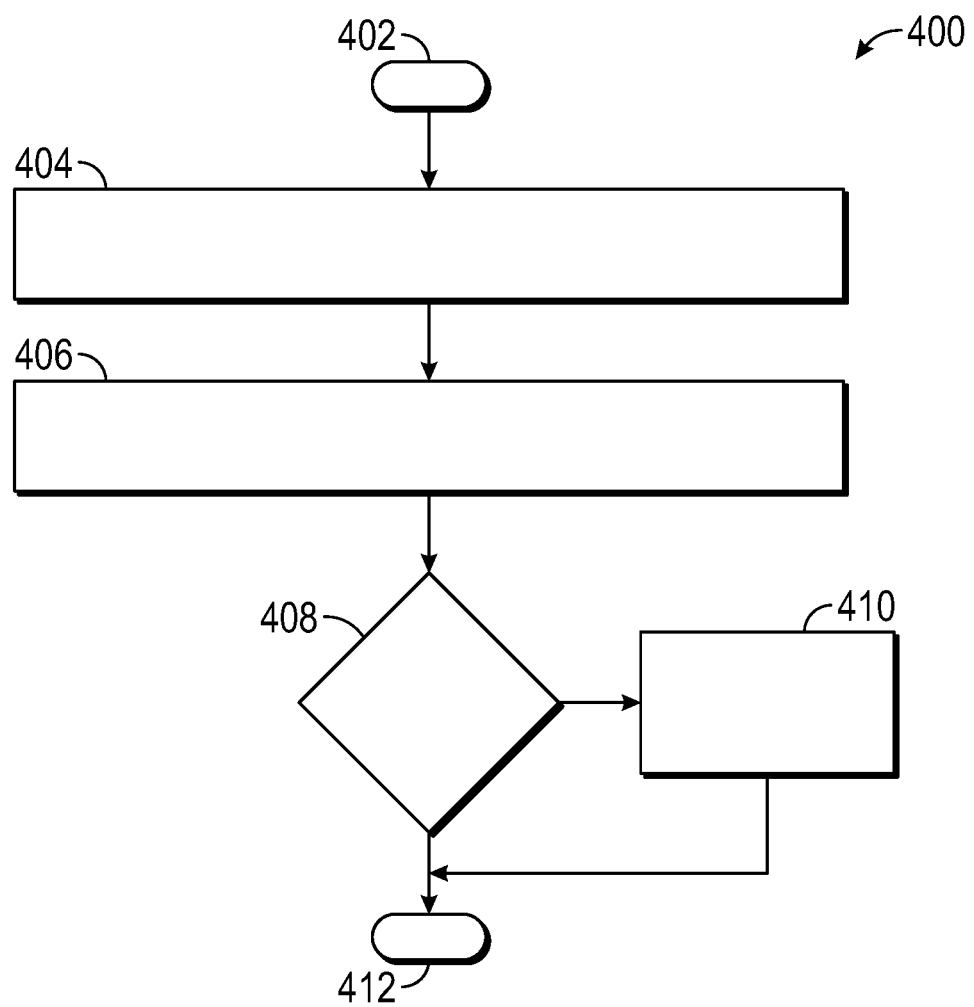
FIG. 14 is a flowchart illustrating another control method of the cabin air quality system of FIG. 1 in accordance with various embodiments.

Referring now to FIG. 14, and with continued reference to FIGS. 1-10, a flowchart illustrates a control method 400 that can be performed by the filter sensor monitor module 27 of FIGS. 1 and 10A in accordance with the present disclosure. As can be appreciated in light of the disclosure, the order of operation within the method is not limited to the sequential execution as illustrated in FIG. 14, but may be performed in one or more varying orders as applicable and in accordance with the present disclosure.

In various embodiments, the method can be scheduled to run periodically, or based on predetermined events, and for example, can run based on a start-up or ignition on status of the vehicle 10.

The method begins at 402. At 404, the method receives and processes the sensor signals from the first filter sensor 24 and the sensor signals from the second filter sensor 26. At 406, based on the received sensor signals, the method queries the airflow datastore 254 and determines the filter status 256 for the fine particulate matter filter 50. At 408, the method determines whether the filter status 256 is replace. If the filter status 256 indicates to replace the fine particulate matter filter 50, at 410, the method outputs the status notification 264 for the cabin air quality control module 20. Otherwise, the method ends at 412.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling an air quality within a passenger cabin, the passenger cabin including a heating, ventilation and cooling (HVAC) system and an outlet and temperature control system, the method comprising:
   outputting one or more control signals, by a processor, to activate a motor to generate an airflow stream for observation by a fine particulate matter sensor, the fine particulate matter sensor generating sensor signals based on the observation;
   determining a concentration level of fine particulate matter in the airflow based on the sensor signals;
   determining that the concentration level is in one of a first range, a second range or a third range based on the concentration level; and
   based on the determining that the concentration level is in the first range, outputting one or more control signals to a HVAC motor associated with the HVAC system to drive a HVAC blower at a first speed to generate an airflow into the passenger cabin and outputting one or more control signals to actuators associated with the outlet and temperature control system to adjust a position of outlet doors to provide a bi-level outlet for the airflow into the passenger cabin, and based on the determining that the concentration level is in the second range, outputting one or more control signals to the HVAC motor associated with the HVAC system to drive the HVAC blower at a second speed to generate the airflow into the passenger cabin and outputting one or more control signals to the actuators associated with the outlet and temperature control system to adjust the position of the outlet doors to provide the bi-level outlet for the airflow into the passenger cabin, the second speed greater than the first speed and the concentration level in the second range greater than the first range, the airflow into the passenger cabin flowing through a fine particulate matter filter.

2. The method of claim 1, wherein the HVAC blower is in fluid communication with the fine particulate matter filter such that the airflow passes through the fine particulate matter filter prior to the airflow entering the passenger cabin.

3. The method of claim 1, wherein the air quality system includes an air inlet system associated with the passenger cabin, and the method includes outputting one or more control signals to an inlet door actuator of the air inlet system to move an air inlet door to a second, closed position based on the determining that the concentration level is in the third range.

4. The method of claim 1, further comprising:
   receiving and processing first filter sensor signals from a first filter sensor coupled to the fine particulate matter filter;
   receiving and processing second filter sensor signals from a second filter sensor coupled to the fine particulate matter filter, the second filter sensor downstream from the first filter sensor;
   determining a filter status based on the processing of the first filter sensor signals and the second filter sensor signals; and
   outputting a filter notification to at least one user interface associated with the passenger cabin based on the determined filter status.

5. The method of claim 1, further comprising:
   determining an air quality level based on the determined concentration level; and
   outputting the determined concentration level and the determined air quality level to at least one user interface associated with the passenger cabin.

6. The method of claim 5, wherein the at least one user interface is associated with a visor positioned within the passenger cabin.

7. The method of claim 1, further comprising a source of a mode of operation of the air quality system, wherein the outputting of the one or more control signals to the HVAC motor based on the determining that the concentration level is in the first range further comprises outputting the one or more control signals to the HVAC motor based on the determining that the concentration level is in the first range and the mode of operation as automatic mode.

8. An air quality control system for a passenger cabin, comprising:
   a fine particulate matter sensor system that includes a motor, the motor operable to drive a blower to create an airflow stream for observation by a fine particulate matter sensor, the fine particulate matter sensor generating sensor signals based on the observation;
   an air quality system associated with the passenger cabin, the air quality system including a fine particulate matter filter, an outlet and temperature control system and a heating, ventilation and cooling (HVAC) system that is operable to generate an airflow through the fine particulate matter filter into the passenger cabin; and
   a control module having a processor configured to:
      output one or more control signals to the motor of the fine particulate matter sensor system to drive the blower;
      receive and process the sensor signals and determine a concentration level of fine particulate matter based on the processing;

determine that the concentration level is in one of a first range, a second range or a third range based on the concentration level;

based on the determination that the concentration level is in the first range, output one or more control signals to a HVAC motor associated with the HVAC system to drive a HVAC blower at a first speed to generate the airflow and output one or more control signals to actuators associated with the outlet and temperature control system to adjust a position of outlet doors to provide a bi-level outlet for the airflow into the passenger cabin; and based on the determination that the concentration level is in the second range, output one or more control signals to the HVAC motor associated with the HVAC system to drive the HVAC blower at a second speed to generate the airflow and output one or more control signals to the actuators associated with the outlet and temperature control system to adjust the position of the outlet doors to provide the bi-level outlet for the airflow into the passenger cabin, and the second speed is greater than the first speed.

9. The air quality control system of claim 8, wherein the air quality system further comprises an air inlet door system associated with the passenger cabin, and the processor of the control module is configured to output one or more control signals to a door actuator of the air door system to move an air door to a second, closed position based on the determination that the concentration level is in the third range.

10. The air quality control system of claim 8, further comprising:
a first filter sensor coupled to the fine particulate matter filter that observes an airflow through the fine particulate matter filter and generates first filter sensor signals based on the observation; and
a second filter sensor coupled to the fine particulate matter filter that observes an airflow through the fine particulate matter filter and generates second filter sensor signals based on the observation, the second filter sensor downstream from the first filter sensor,
wherein the processor of the control module is configured to receive and process the first filter sensor signals and the second filter sensor signals, determine a filter status based on the processing, and output a filter notification to at least one user interface associated with the passenger cabin based on the determined filter status.

11. The air quality control system of claim 8, wherein the processor of the control module is configured to determine an air quality level based on the determined concentration level and output the determined concentration level and the determined air quality level to at least one user interface associated with the passenger cabin.

12. The air quality control system of claim 11, wherein the at least one user interface is associated with a visor positioned within the passenger cabin.

13. A vehicle, comprising:
a passenger cabin having a console;
a fine particulate matter sensor system coupled to the console, the fine particulate matter sensor generating sensor signals based on an observation of an airflow through an opening defined in the console;
an air quality system including a fine particulate matter filter and a heating, ventilation and cooling (HVAC) system that is operable to generate an airflow through the fine particulate matter filter and into the passenger cabin;

at least one user interface disposed in the passenger cabin; and
a control module having a processor configured to:
receive and process the sensor signals;
determine a concentration level of fine particulate matter based on the processing;
determine that the concentration level is in one of a first range, a second range or a third range based on the concentration level;
based on the determination that the concentration level is in the first range, output one or more control signals to a HVAC motor associated with the HVAC system to drive a HVAC blower at a first speed to generate the airflow and output one or more control signals to actuators associated with the outlet and temperature control system to adjust a position of outlet doors to provide a bi-level outlet for the airflow into the passenger cabin;
based on the determination that the concentration level is in the second range, output one or more control signals to the HVAC motor associated with the HVAC system to drive the HVAC blower at a second speed to generate the airflow and output one or more control signals to the actuators associated with the outlet and temperature control system to adjust the position of the outlet doors to provide the bi-level outlet for the airflow into the passenger cabin;
based on the determination that the concentration level is in the third range, output one or more control signals to the HVAC motor associated with the HVAC system to drive the HVAC blower at a third speed to generate the airflow and output one or more control signals to the actuators associated with the outlet and temperature control system to adjust the position of the outlet doors to provide a floor outlet for the airflow into the passenger cabin, the third speed greater than the second speed and the first speed, and the second speed greater than the first speed; and
output the determined concentration level for display on the at least one user interface.

14. The vehicle of claim 13, wherein the processor of the control module is configured to determine an air quality level based on the determined concentration level and output the determined air quality level for display on the at least one user interface.

15. The vehicle of claim 13, wherein the at least one user interface is associated with a visor positioned within the passenger cabin.

16. The method of claim 1, wherein based on the determination that the concentration level is in the third range, the method comprises outputting one or more control signals to the HVAC motor associated with the HVAC system to drive the HVAC blower at a third speed to generate the airflow, the third speed greater than the second speed and the first speed, outputting one or more control signals to the actuators associated with the outlet and temperature control system to adjust the position of the outlet doors to provide a floor outlet for the airflow into the passenger cabin, and outputting one or more control signals to the actuators associated with the outlet and temperature control system to adjust the position of the outlet doors to provide the bi-level outlet for the airflow into the passenger cabin based on the expiration of a timer.

17. The air quality control system of claim 8, wherein the concentration level in the second range is greater than the first range.

18. The air quality control system of claim 8, wherein based on the determination that the concentration level is in the third range, the processor of the control module is configured to output one or more control signals to the HVAC motor associated with the HVAC system to drive the HVAC blower at a third speed to generate the airflow, the third speed greater than the second speed and the first speed, output one or more control signals to the actuators associated with the outlet and temperature control system to adjust the position of the outlet doors to provide a floor outlet for the airflow into the passenger cabin, and output one or more control signals to the actuators associated with the outlet and temperature control system to adjust the position of the outlet doors to provide the bi-level outlet for the airflow into the passenger cabin based on the expiration of a timer.

19. The vehicle of claim 13, wherein the air quality system further comprises an air inlet door system associated with the passenger cabin, and based on the determination that the concentration level is in the third range, the processor of the control module is configured to output one or more control signals to a door actuator of the air door system to move an air door to a second, closed position and output one or more control signals to the actuators associated with the outlet and temperature control system to adjust the position of the outlet doors to provide the bi-level outlet for the airflow into the passenger cabin based on the expiration of a timer, the concentration level in the third range greater than the second range and the first range.

* * * * *